(12) United States Patent
Mohammed et al.

(10) Patent No.: US 12,107,509 B1
(45) Date of Patent: Oct. 1, 2024

(54) INTELLIGENT ONLINE CONTROLLER FOR INVERTER BASED RESOURCES

(71) Applicants: Osama Mohammed, Miami, FL (US); Ahmed Soliman, Miami, FL (US); S M Sajjad Hossain Rafin, Miami, FL (US)

(72) Inventors: Osama Mohammed, Miami, FL (US); Ahmed Soliman, Miami, FL (US); S M Sajjad Hossain Rafin, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/477,936

(22) Filed: Sep. 29, 2023

(51) Int. Cl.
  *H02M 7/217* (2006.01)
  *G06N 3/045* (2023.01)
  *H02J 3/38* (2006.01)

(52) U.S. Cl.
  CPC .......... *H02M 7/2173* (2013.01); *G06N 3/045* (2023.01); *H02J 3/381* (2013.01)

(58) Field of Classification Search
  None
  See application file for complete search history.

(56) References Cited

U.S. PATENT DOCUMENTS

| | | | | |
|---|---|---|---|---|
| 5,943,660 A * | 8/1999 | Yesildirek | ............ | G05B 13/027 706/15 |
| 2014/0362617 A1 * | 12/2014 | Li | ............ | H02J 3/381 363/79 |
| 2016/0329714 A1 * | 11/2016 | Li | ............ | H02M 1/42 |
| 2018/0026449 A1 * | 1/2018 | Benosman | ............ | H02J 3/381 307/84 |

* cited by examiner

*Primary Examiner* — Mohammad Ali
*Assistant Examiner* — Saad M Kabir
(74) *Attorney, Agent, or Firm* — Saliwanchik, Lloyd & Eisenschenk

(57) ABSTRACT

Systems and methods for the control and operation of a grid-connected converter with an energy storage system are provided. The system can include a small microgrid comprising an AC grid that is feeding a DC load through a converter. The converter is connected to the AC grid through an R-L filter. The classical linear controllers have limitations due to their slow transient performance and low robustness against parameter variations and load disturbances. In certain embodiments, the transient and steady state responses of the provided artificial intelligence based Robust Artificial Neural Network Tracking Control (RANNTC) of three-phase grid-connected power converters has been shown to be more enhanced in terms of overshoot (24% lower), settling time (85% reduced), and total harmonic distortion (THD) (55% lower).

17 Claims, 36 Drawing Sheets

INTELLIGENT ONLINE CONTROLLER FOR INVERTER BASED RESOURCES

GOVERNMENT SUPPORT

This invention was made with government support under 80NSSC21M0310 awarded by the National Aeronautics and Space Administration. The government has certain rights in the invention.

BACKGROUND

In the last era, a series of new environmentally friendly power generating technologies have been developed. These new technologies (e.g., wind and solar) have a great potential to give the required electrical power with a low negative impact on the environment. However, these newer power generating units supply relatively small ratings compared to the traditional power generation technologies such as fossil fuel or nuclear driven turbines.

Because of the intermittent nature of these renewable energy resources, converters are considered a key element within the new power system. The power electronic based converters are currently recognized as the only way to attach all these power resources to a grid with a specified voltage and frequency levels.

A new horizon is presented for power systems comprising microgrids driven by intelligent control resources. Microgrids can operate in two different power operating modes, one is a grid-connected mode, while the other is an autonomous mode. Power converters are classified based on their role in the power network. These converters can operate as a grid-forming, grid-feeding, and grid supporting power converters. The grid-forming converter acts as AC voltage source with series low impedance. It is responsible for creating the AC voltage with the required frequency by the network. While the grid-feeding converter is acting as an AC current source with high parallel impedance. It is used to feed a certain amount of power to the grid. The grid-supporting converter operates between the other two types. Its main objective to provide and deliver specific amounts of active and reactive power as needed to regulate the voltage and frequency of the network.

Three-phase pulse-width-modulated (PWM) power converters play a key role in industrial applications especially with renewable energy resources integration, energy storage systems, and related technologies. The power electronic based converters are widely used to attach power resources to a grid with a specified voltage and frequency. A new horizon has been presented for power systems comprising these new resources. A microgrid concept has been introduced in related art, although it remains that related art controllers can fail to provide sufficiently dynamic, accurate, versatile, and adaptive performance for grid-connected applications.

BRIEF SUMMARY

Embodiments of the subject invention provide an intelligent controller that is versatile, adaptive, and can provide high-quality performance for different grid applications. Embodiments provide an artificial intelligence based Robust Artificial Neural Network Tracking Control (RANNTC) controller of three-phase grid-connected power converters. The advantages of certain embodiments of this novel intelligent control compared to related art systems and methods include, but are not limited to:

(1) A novel high-performance artificial data-driven RANNTC controller for a grid-connected converter provides a simple 3 layer neural network structure to achieve faster (e.g., 80% reduction in settling time in transient states) and robust dynamic performance (e.g., stable at various wide ranges of loading conditions and parameters) compared with traditional controller techniques. (2) The provided control architecture exhibits robust control performance against parameter variations. (3) Certain embodiments provide real time implementation and verification of the provided RANNTC control scheme which has been validated on an actual hardware power system. (4) The provided controller has a proven fast dynamic response (e.g., 80% reduction in settling time in transient states) with excellent power quality (e.g., 58% reduction in THD with odd harmonics reduction). It also proved its robustness over a wide control bandwidth which was tested against different conditions. (5) The evaluation of the provided control performance has been validated utilizing different controllers based on simulation using MATLAB Simulink software (MathWorks, Natick, MA) and experiment using dSPACE 1104 (dSPACE GmbH, Paderborn, Germany) and state-of-the-art power electronics and electrical apparatus in an FIU Smart Grid Testbed setup (Florida International University, Miami, FL).

Embodiments of the subject invention provide an intelligent controller referred to as a novel RANNTC through an Online Learning Recurrent Radial Basis Function Neural Network (RRBFN) that has gaussian activation function for its neurons in the hidden layer employing a Gradient Descent Adaptation (GDA) for cost function optimization without requiring any historical data sets for pre training. Embodiments provide a complete algorithm (e.g., a mathematical model) for the provided converter and its control system. One prototype development embodiment provides a small microgrid comprising an AC grid feeding a DC load through a converter. The converter was connected to the AC grid through an R-L filter. Related art classical linear controllers have limitations due to their slow transient performance and low robustness against parameter variations and load disturbances. In embodiments of the subject invention, machine-learned controllers are used to avoid certain drawbacks of the traditional controller. First, a study for conventional nested loop Proportional Integral (PI) was introduced for both outer and inner loops of a PI-PI controller. A novel RANNTC controller according to an embodiment of the subject invention was developed for the same application. A comparison between the normal traditional PI-PI controller and the RANNTC controller was made under a variety of operating scenarios. The converter control was tested under various operational conditions, and its dynamic and steady-state behavior was analyzed. The model was tested in MATLAB Simulink to check the normal operation of the network in a grid-connected mode under different load disturbances and AC input voltage. The system was designed, fabricated, and implemented in a hardware environment in an Energy Systems Research Laboratory (ESRL, Florida International University, Miami, FL) testbed, and the hardware test results were verified.

The results showed that the provided RANNTC controller was more robust and had better transient and steady state performances.

Embodiments provide a novel intelligent controller, referred to herein as a RANNTC, developed through an Online Learning Recurrent Radial Basis Function Neural Network (RRBFN) that has a gaussian activation function for its neurons in the hidden layer employing a GDA for cost function optimization without requiring any historical data sets for pre training.

In addition to advantages listed above, certain embodiments have additional advantages including but not limited to the following:

(1) In terms of power quality and total harmonic distortion (THD), embodiments surpassed performance by 58% reduction with odd harmonic elimination as compared to the conventional proportional-integral (PI), Ho, Sliding Mode Control (SMC), and Fuzzy Based Control (FBC). (2) Embodiments provided approximately 100% accurate voltage tracking, which is 90% higher than that of the conventional control methods. (3) The novel RANNTC in certain embodiments provides a real-time adaptive intelligent controller compared with other PI and Ho controls. Although, SMC and FBC each, respectively, have adaptive features, the provided RANNTC exceeds their performance by incorporating real-time adaptive ability. (4) The provided RANNTC covers a wide operational bandwidth of approximately 1 kHz without need for parameter tuning or modifying the control scheme because of its adaptive online learning approach. (5) The architecture of the provided RANNTC, as compared to SMC, and FBC, does not require high computational capabilities. This is, at least in part, because the provided RANNTC does not require huge data sets to train the NN beforehand, and online adaptive training helps reduce resources to execute the algorithm, which make it more suitable for implementation in commercial micro-processor-based or FPGA-based applications. (6) The provided controller has a proven fast dynamic response (e.g., 80% reduction in settling time in transient states) with excellent power quality (e.g., 58% reduction in THD with odd harmonics elimination.) It also proved its robustness over a wide control bandwidth by testing the controller against different conditions. (7) Because of the characteristics of the provided controller, embodiments could be advantageously applied in many different commercial applications.

Turning now to a detailed description of an embodiment of the provided RANNTC Control, in one embodiment an online learning-based ANN was introduced where a hidden output vector of the neural network (NN) was updated online (e.g., in real time) till reaching convergence. The RANNTC control was developed using an online learning approach. The provided RANNTC controller was built by adding a conventional PI controller in the outer DC voltage control loop to a parallel pair of ANN based controllers driving the d-q axis currents. A sinusoidal pulse width modulation (SPWM) technique was used at different switching frequency levels through a 3-phase SPWM rectifier.

Turning now to a detailed description of an embodiment of the provided RRBFN Model, in one embodiment a three-layer RRBFN was developed to implement the RRBFN estimators and improve the function approximation accuracy. The structure of the RRBFN includes an input, hidden along with the output layer. The RRBFN has three layers: an input layer, a hidden layer with a non-linear activation function, and a linear output layer. As shown in FIG. 5, the input layer has two signals: the error signal, and its derivative. The output vector of the hidden layer is a function of the input signals, center, width, and previous iteration of the self-feedback gain as depicted in equation (23). Finally, the global output of the RRBFN is a function of each hidden layer output and their weights as shown in equation (22). In addition, the Gaussian function was employed as the activation function in the hidden layer because of its differential and continuous features.

Turning now to a detailed description of an embodiment of the provided RRBFN Training via Gradient-Descent Algorithm, in one embodiment an objective was defined to minimize the error cost function for each discrete time t. The gradient-descent adaptation algorithm was employed for updating the weights, center, and width of the RRBFN. The update laws for the RRBFN parameters were updated to define the learning rate parameters of the connecting weights, center, and width within an instant t that regularly decays with time to an insignificant value.

Combining the above features, embodiments provide a versatile real-time adaptive intelligent controller that achieved a high-quality performance as compared to related art controllers in many grid applications. Embodiments provide a real-time adaptive intelligent controller, defined as a controller that can automatically adapt its parameters based on the actual operational scenario in a real-time environment without the need for design readjustment by any outside person or system. Embodiments provide high quality performance, defined as a state of performance in which the controller behaves stably in both transient and steady-state conditions in terms of overshoot, settling time, power quality, and robustness against parameter variations.

It has been noted that not all related art controllers are dynamic, accurate, versatile, and adaptive. Further, not all can provide high performance for grid-connected applications. Embodiments of the subject invention provide an intelligent controller that is dynamic, accurate, versatile, and adaptive. Embodiments of this intelligent control can be applied for different power electronics building blocks to reach better performance for grid-connected applications.

DETAILED DESCRIPTION

Figure 1:
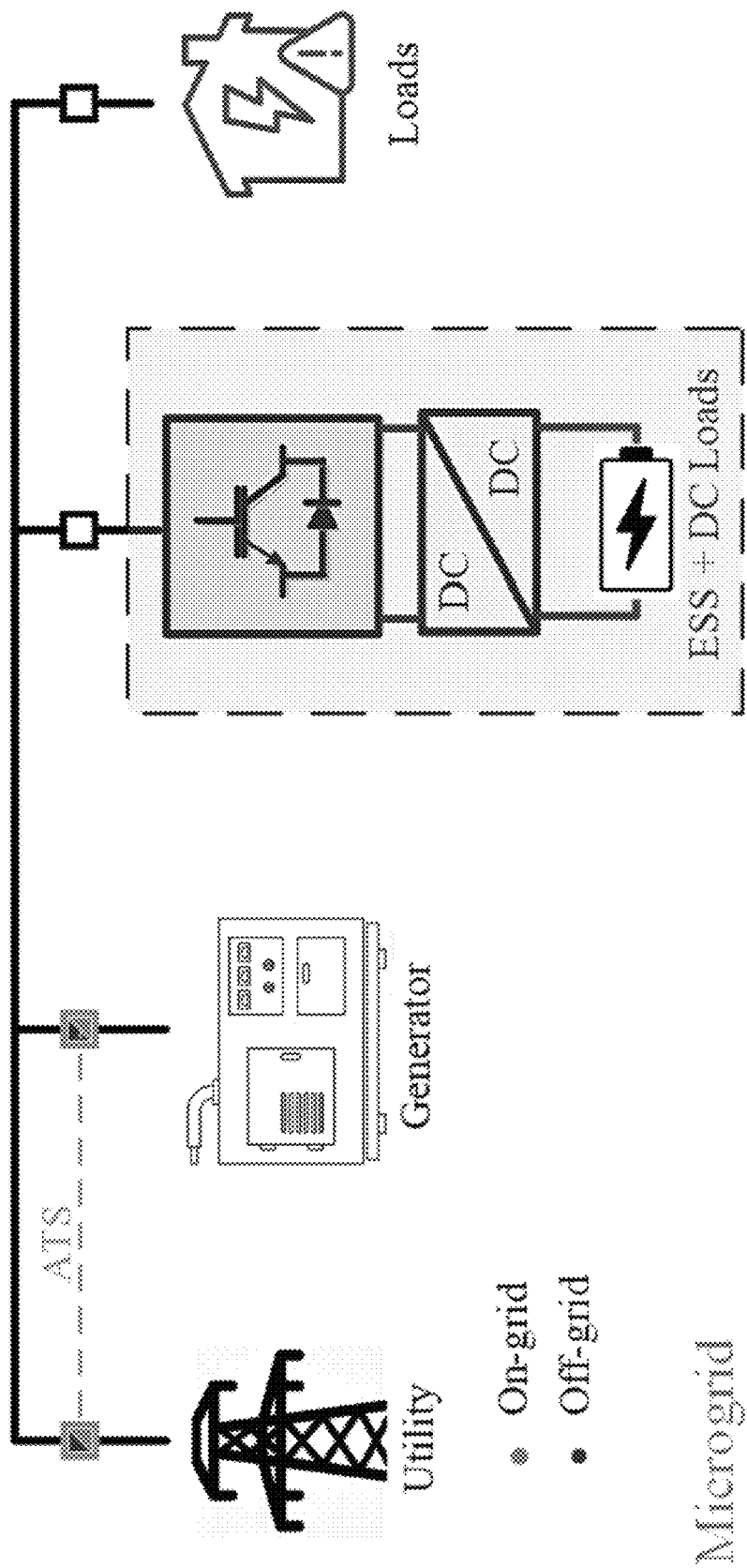
FIG. 1 illustrates a microgrid-based system testbed architecture according to an embodiment of the subject invention. As used herein, On grid means distributed power systems where power converters are connected to the national grid which has very high inertia and it is said to be an infinite bus of a high short circuit ratio (SCR) that reflects a point of common coupling with stable voltage and frequency levels. As used herein, Off grid means distributed power systems which are islanded and power converters are not connected to the national grid. Rather, they are fed from alternative resources or distributed generators that have relatively low inertia and is said to be a local bus of a low SCR that reflects a point of common coupling that is more vulnerable to voltage instability.

Embodiments of the subject invention provide an intelligent online controller for an inverter including a novel RANNTC developed through an Online Learning RRBFN that has gaussian activation function for its neurons in the hidden layer employing a GDA for cost function optimization without requiring any historical data sets for pre training. In one embodiment, a complete mathematical model is provided for the provided converter and its control system. Embodiments provide a small microgrid comprising an AC grid feeding a DC load through a converter. The converter can be connected to the AC grid through an R-L filter. The classical linear controllers have limitations due to their slow transient performance and low robustness against parameter variations and load disturbances. In certain embodiments, machine-learned controllers reduced drawbacks of related art controllers. In Example 1, below, a study for conventional nested loop PI was introduced for both outer and inner loops PI-PI controller. A novel RANNTC controller was according to an embodiment of the subject invention was developed by the inventors. A comparison between the related art traditional PI-PI controller and the novel RANNTC controller was made under different operating scenarios. The converter control was tested under various operational conditions, and its dynamic and steady-state behavior was analyzed. The model was done through MATLAB Simulink to check the normal operation of the network in a grid-connected mode under different load disturbances and AC input voltage. The system was designed, fabricated, and implemented in a hardware environment in the ESRL testbed, and the hardware test results were verified. The results showed that the provided RANNTC controller was more robust and had better transient and steady state performances.

As shown in Table 1, differences between different controllers include advantages, drawbacks, time response, complexity, and power quality related issues for each controller. The evaluation of the provided control performance has been studied in the examples in this disclosure to demonstrate differences between different controllers based on simulation and experimental results. Embodiments of the subject invention, including those labeled as RANNTC in Table 1, exhibit many advantages over available related art systems, including the following. (1) Embodiments comprising a novel high-performance artificial data-driven RANNTC controller for a grid-connected converter can provide simple structure to achieve fast and robust dynamic performance compared with traditional controller techniques. (2) The provided control architecture provides robust control performance against parameter variations. (3) In certain embodiments real time implementation and validation of the provided RANNTC control scheme is provided.

TABLE 1

COMPARISON BETWEEN DIFFERENT POWER CONVERTER CONTROL STRATEGIES

| Controller | Advantages | Disadvantages | Time Response | Complexity | Power Quality |
|---|---|---|---|---|---|
| P | Simple<br>Exhibits higher power factor w.r.t PI<br>Better THD with zero-sequence injection | Poor steady state error<br>Good transient response only if duty-cycle feed-forward is also implemented | Slow | Very Simple | Better than PI |
| PI | Flexible & Reliable<br>Low computational burden<br>Widely used in d-q frame | Requires careful bandwidth design based on the actual situation and system dynamics<br>Fail to remove steady-state error when dealing with sinusoidal waveforms<br>Very sensitive to parameter variations<br>Poor compensating capability of harmonics in grid-connected systems | Slow | Very Simple | Poor |
| PR | Can eliminate steady-state error<br>Achieve very high gain around resonance frequency<br>High dynamic characteristics<br>Implementation in abc is straightforward | More resonant controllers are needed for harmonic compensation<br>Influence of the isolated neutral must be accounted | Slow | Simple | Has selective harmonic compensation capability |
| Hysteresis | Preferred in digital systems<br>High dynamic performance<br>No need for a modulator<br>Suitable for microprocessor-based implementations | Performance is proportional to a sampling frequency<br>Complex in ABC reference frame.<br>Adaptive band is needed to obtain fixed $f_{sw}$ | Moderate | Simple | Moderate |
| Deadbeat | High dynamic performance<br>Preferred in digital systems<br>No need for a modulator<br>High speed with observer to compensate delay<br>Suitable for microprocessor-based implementations | Performance is proportional to sampling frequency<br>Introduces sample time delay | Fast | Simple | Poor |
| H∞ | Reliable<br>Good reference tracking | Not easy to implementation<br>High control gains<br>Weighing functions are complex | Slow | Complex | Good |
| SMC | Enhanced small signal stability<br>Easy implementation<br>Robust against parameter variations | Chattering problem<br>Accurate state estimation is needed | Moderate | Simple | Good |
| PBC Pasitivity-Based Control | Less chattering<br>Improved dynamic stability<br>Ensure global stability | Difficult equilibrium point setting<br>Requires Detailed system model | Moderate | Simple | Moderate |
| FBC Fuzzy Based Control | Good Disturbance rejection<br>Good tracking | Complex<br>Based on expert knowledge | Fast | Complex | Excellent |
| MPC | Good dynamic response<br>Robust against Parameter variations<br>Good Reference tracking | Suffers from parametric uncertainties<br>Relies on Mathematical model<br>Multi-input Multi-output<br>High computational cost<br>Multi-objective optimization | Fast | Complex | Excellent |
| RANNTC | Accurate tracking ability and disturbance rejection capabilities.<br>Higher accuracy and simpler structure compared with [offline ref.][*].<br>Reduced computational cost in online learning compared with offline based approach [*].<br>More robust compared with PI controller against parameter variations. | | Fast | Moderate to Complex | Excellent |

[*] Z. Li, et. al, "Control of a Grid-Forming Inverter Based on Sliding-Mode and Mixed $H_2/H_c$ Control," in IEEE Transactions on Industrial Electronics, vol. 64, no. 5, pp. 3862-3872, May 2017, doi: 10.1109/TIE.2016.2636798, which is hereby incorporated by reference in its entirety, including all figures and tables.

Figure 2:
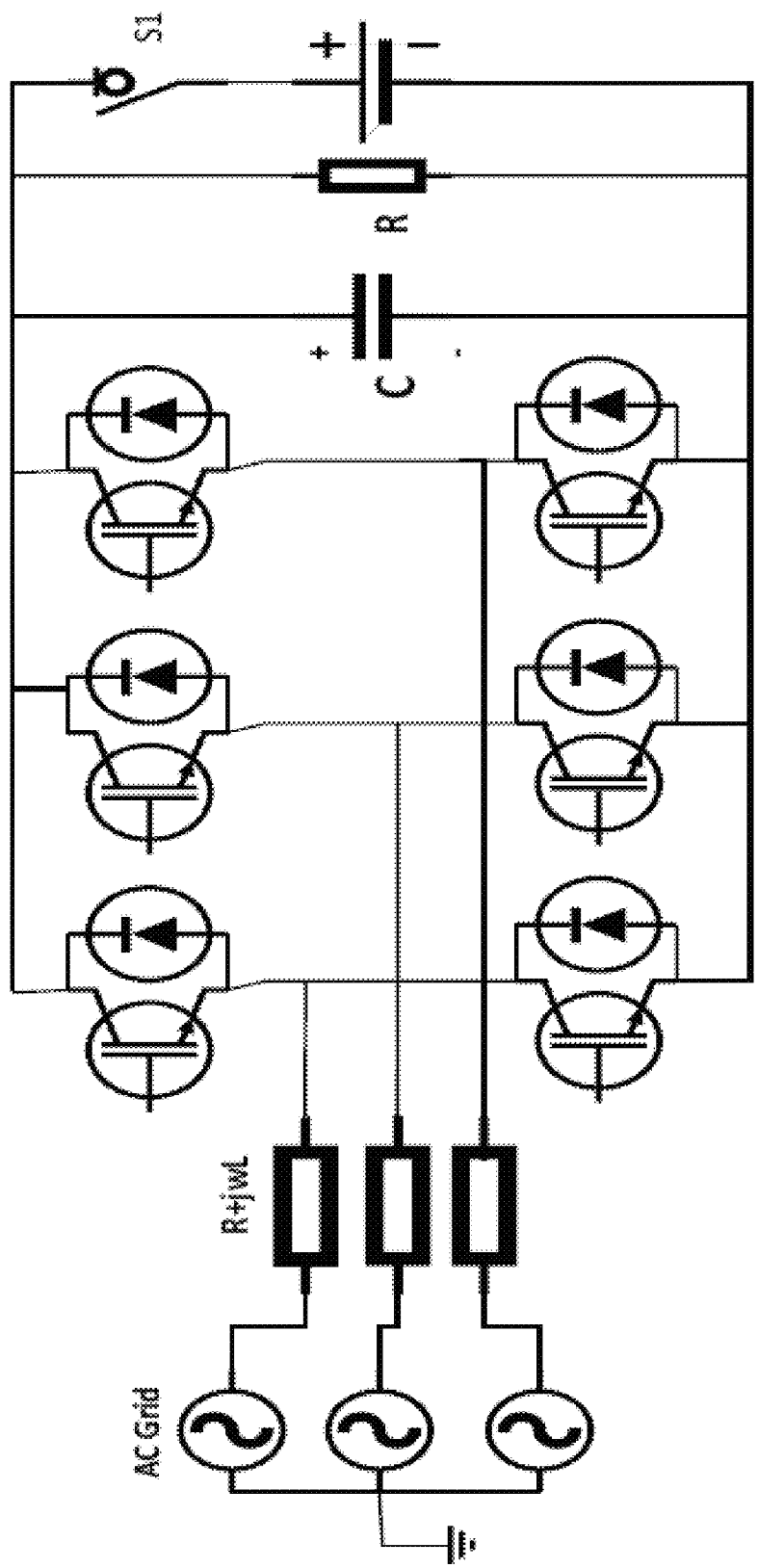
FIG. 2 illustrates a system model including the converter according to an embodiment of the subject invention. A DC battery is connected with the converter through Si. A resistive load R and a DC side filter capacitor C are connected in parallel with the battery.

A system model representing the structure of the converter model is shown in FIG. 2. An AC source with a balanced 3 phase voltage of amplitude E and frequency f is feeding RL load through a 2 level 3-phase full-wave insulated-gate bipolar transistor (IGBT)-based converter acting as a rectifier. R and L represent the resistance and inductance, respectively, connected between the AC supply and the converter AC terminals.

The dynamic equation describing the system is given in equation (1), where $v_{abc}$ is the phase voltage at the converter's AC terminal.

$$e_{abc}(t) - v_{abc}(t) = L\frac{di_{abc}(t)}{dt} + R\, i_{abc}(t) \tag{1}$$

Referring to FIG. 2 and for the output DC side, the dynamic equation of the output side can be expressed as equation (2)

$$i_C(t) = i_{dc}(t) - i_L(t) = C\frac{dv_C(t)}{dt} \tag{2}$$

The line voltages and phase currents can be represented in the d-q synchronous frame by applying the Park's Transformation matrix to the abc voltage and current components as per equation (3).

$$i_{dq}(t) = A \cdot i_{abc}(t) \tag{3}$$

where A is the transform matrix. Equations (4) and (5) represent the system's dynamic model of the d-q reference frame.

$$v_d(t) = e_d(t) - L\frac{di_d(t)}{dt} - R\,i_d(t) + L\omega i_q(t) \quad (4)$$

$$v_q(t) = e_q(t) - L\frac{di_q(t)}{dt} - R\,i_q(t) + L\omega i_d(t) \quad (5)$$

for a unity power factor operation and a balanced case, the q-component of voltage can be set to be zero. So, DC voltage and active power can be directly controlled by d-axis current component ($i_d$), while reactive power can be easily controlled via q-axis current component ($i_q$).

For the DC side, since the input power almost equals to the output power (neglecting the converter losses):

$$i_{dc} = \frac{3v_d(t)}{2v_{dc}(t)} \cdot i_d(t) \quad (7)$$

The d-q current components can be oriented to control the operation of the converter using inner current control loops. Therefore, the system's performance depends on the robustness of the applied control. The main elements of the controller are discussed in the following paragraphs.

A complete mathematical model for the converter voltage and current controllers is presented below. Vector control is used with the DC voltage controller and P & Q powers through controlling the d-q currents.

Figure 3:
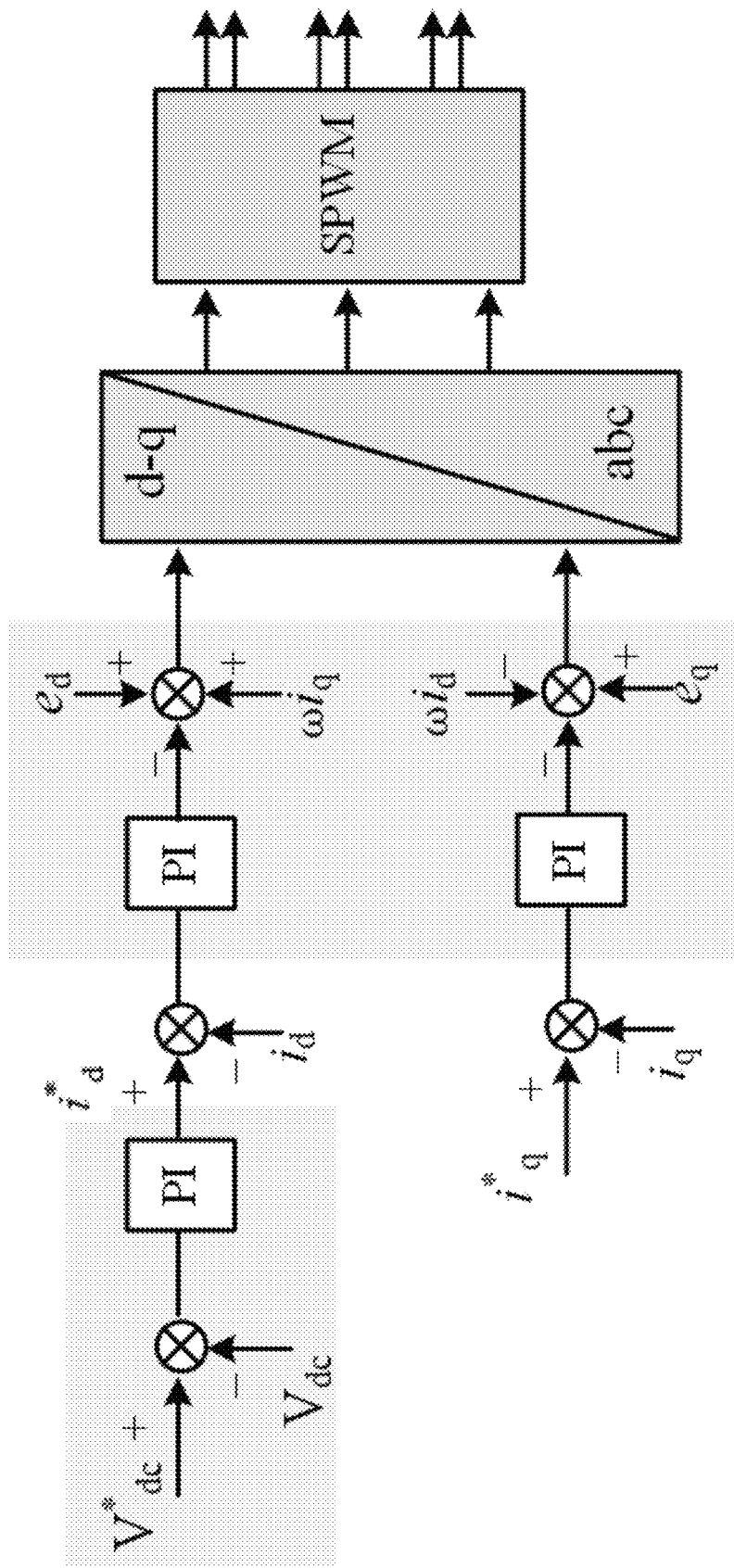
FIG. 3 illustrates a converter outer voltage and inner current controller according to an embodiment of the subject invention.

Vector control is a standard method for grid-connected converters that is commonly used in power system applications and particularly in renewables integration. It can comprise or consist essentially of two nested control loops. As shown in FIG. 3, a faster inner current control loop and a slower outer one. The outer loop could be a voltage control or active and reactive power control. In FIG. 3, DC voltage is controlled through d-axis current component. At the same time, the q-axis current present component can be used to control reactive power to support the grid voltage or controlled at zero to operate the power converter at a unity power factor.

A 3-phase abc reference frame system can be transformed in d-q reference frame through a transformation matrix (e.g., S. Li, et. al, "Direct-current vector control of three-phase grid-connected rectifier-inverter," Electric Power Syst. Res., vol. 81, no. 2, pp. 357-366, February 2011.) The obtained d-q reference frame can be arbitrarily defined as a rotating frame with an arbitrary angular velocity. After applying the transformation matrix to the abc system, equation (1), will result in a constant factor of ω multiplying the matrix defined. The new ω terms in d-q reference frame shown in equations (4) and (5) are called decoupling terms.

Despite the decoupling terms, it has been found that the generated signals from d-q axis PI controllers do not contribute correctly in terms of the objectives of decoupled d-q control. There are some limitations related to the conventional standard vector control. One of these is that standard vector control approaches may behave improperly especially when the converter operates beyond its PWM saturation limit. Additionally, conventional standard vector control is very sensitive to model uncertainties.

A. Inner Current Controller

The inner controller is used to regulate the d-q currents through a PI controller as shown in FIG. 3. This loop contains two current controllers.

Formulating the control model through next equations:

$$\frac{d\gamma_d}{dt} = i_d^* - i_d \quad (8)$$

$$\frac{d\gamma_q}{dt} = i_q^* - i_q \quad (9)$$

$$v^r{}_d = K_p(i^r{}_{td}-i_{td})+K_i\gamma_d-\omega L_f i_q \quad (10)$$

$$v^r{}_q = K_p(i^r{}_{tq}-i_{tq})+K_i\gamma_q-\omega L_f i_d \quad (11)$$

B. Outer Loop Voltage Controller

As shown in FIG. 3, a PI controller is used for the outer loop. This controller gives the d-axis current reference value $i^r{}_d$ to the inner loop. The converter DC voltage is controlled by selecting the DC current reference, $i^r{}_{dc}(t)$ such that:

$$i^r{}_{dc}(t) = K_p(V^r{}_{dc}-V_{dc})+K_i\int[V^r{}_{dc}-V_{dc}] \quad (12)$$

where $V^r{}_{dc}$ is the desired voltage, $K_p$, $K_i$ are the PI parameters.

$$i^r{}_d = \frac{2v_{dc}(t)}{3v_d(t)} \cdot i^r{}_{dc} \quad (13)$$

Figure 4:
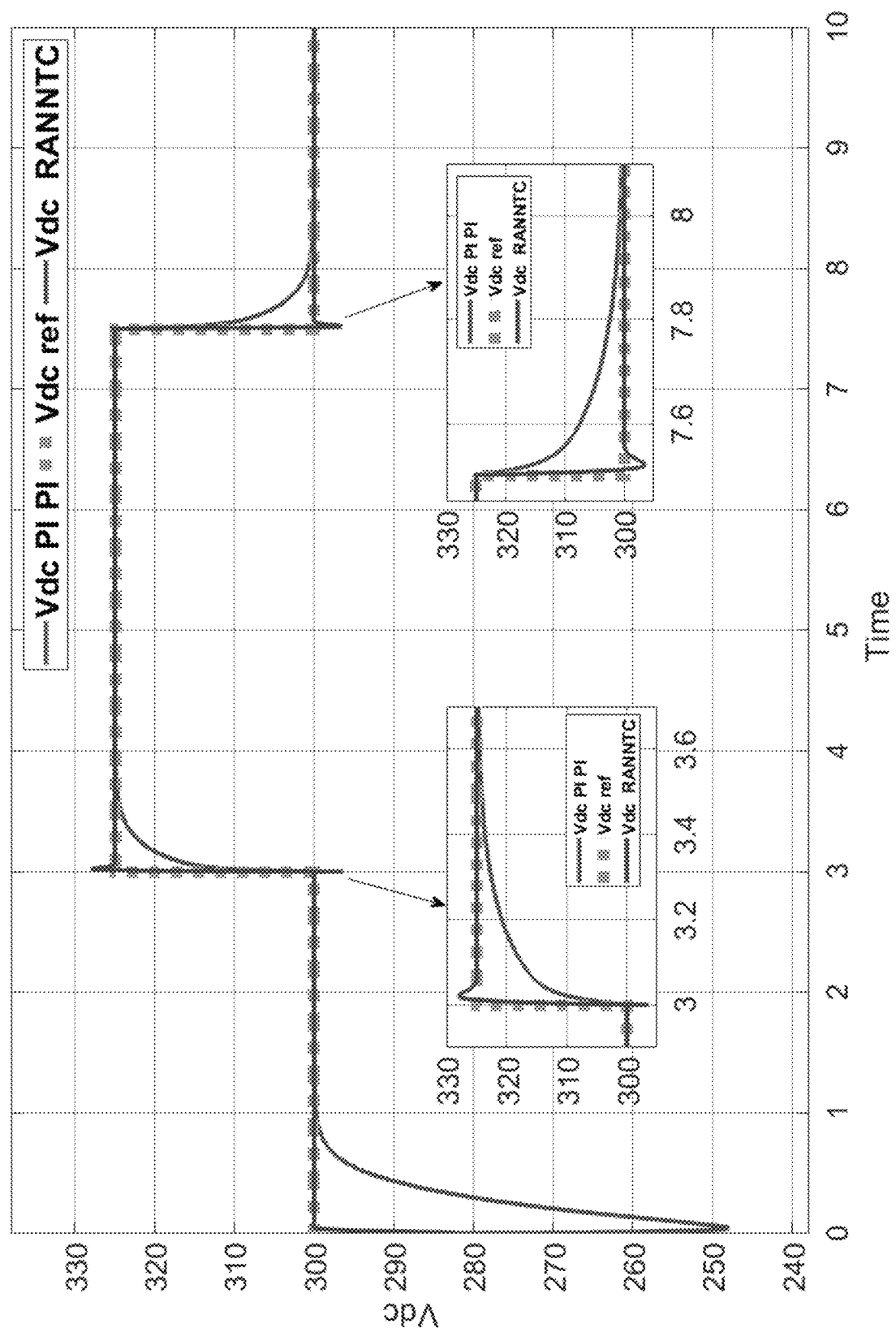
FIG. 4 illustrates a Vdc response against step change according to an embodiment of the subject invention.
Figure 9:
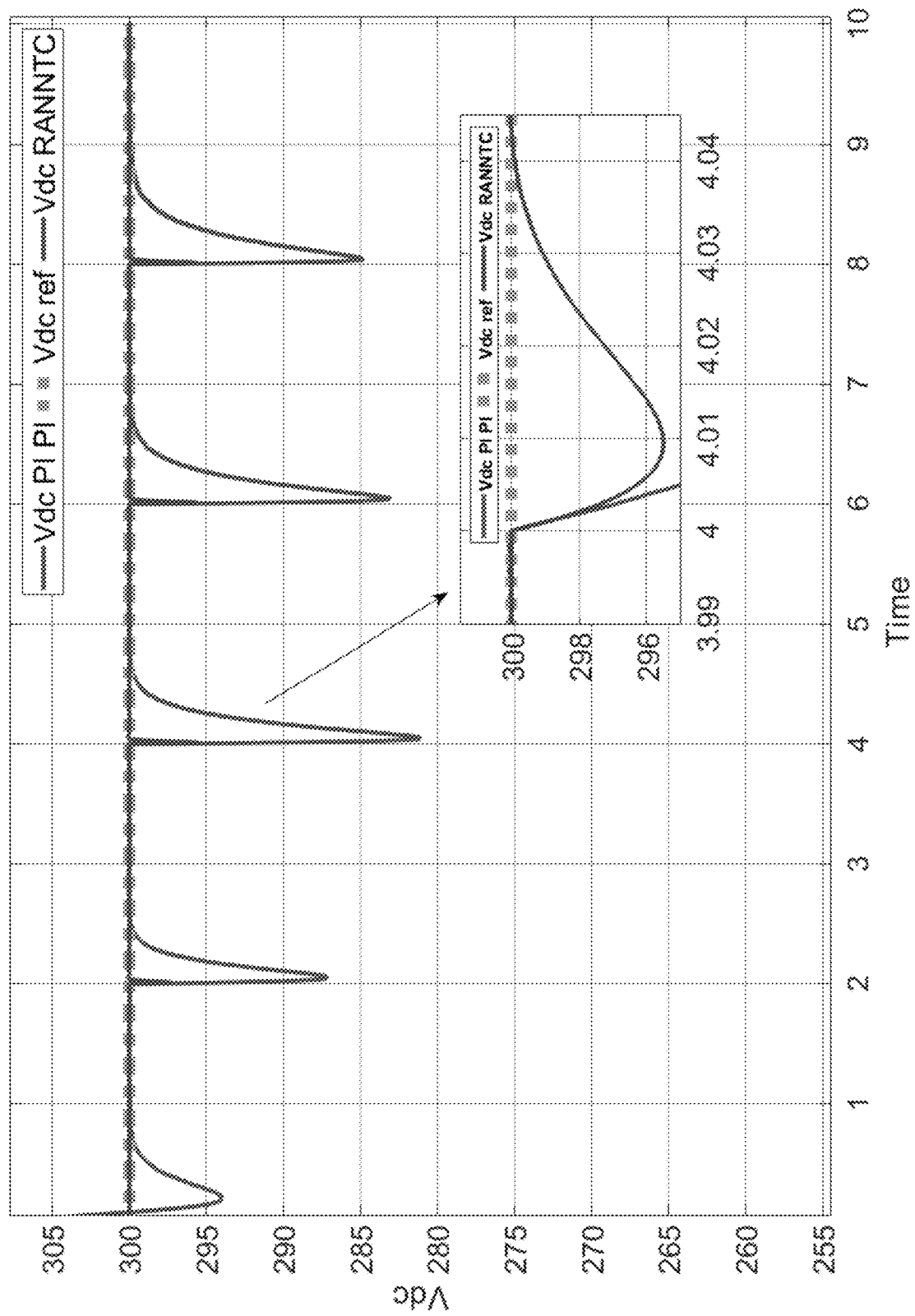
FIG. 9 illustrates a Vdc response against different loading conditions according to an embodiment of the subject invention.

FIG. 4 shows the voltage controller simulated response against a step-change in the DC side voltage from 300 to 325 to 300 v, using the conventional PI and the provided RANNTC controller. FIG. 9 shows the DC voltage response against different loading conditions.

C. Novel RANNTC Control

Implementing mapping between a non-linear input-output can be accomplished using a Neural Network. A neural network can be trained and tuned for a particular application by updating both bias and weights. Knowing and choosing the optimal bias and weight for certain applications is called training the neural network. By using a feed forward neural network instead of traditional controllers, a fast and robust controller can be utilized and implemented to the converter. The primary data from a conventional PI controller can be used to train the neural network.

D. RRBFN Model

In one embodiment, a recurrent three-layer neural network is developed to implement the RRBFN estimators and improve the function approximation accuracy. The structure of the RRBFN involves an input, hidden along with the output layer. In addition, the Gaussian function can be employed as the activation function in the hidden layer because of its differential and continuous features.

E. RRBFN Training via Gradient-Descent Algorithm

Figure 7:
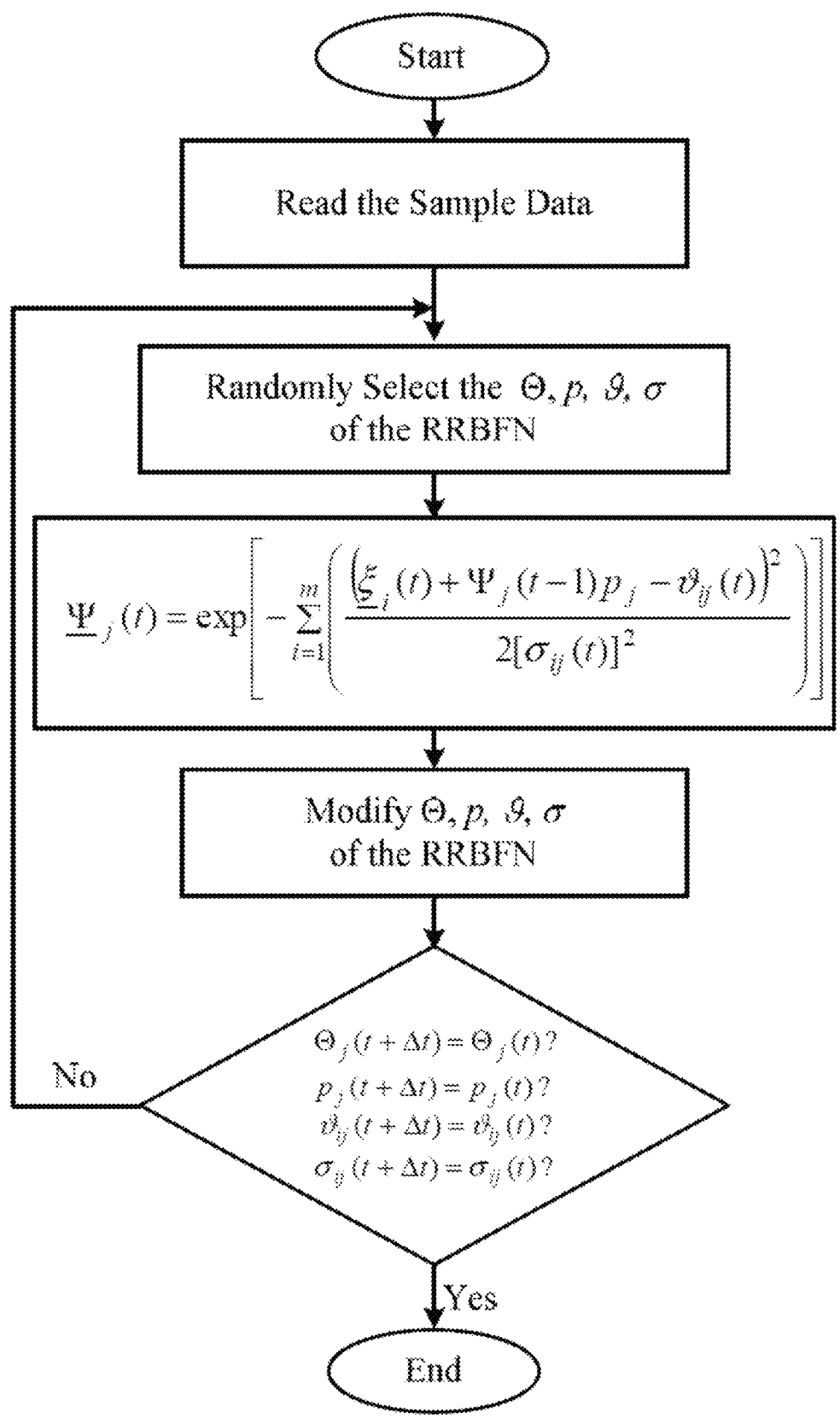
FIG. 7 illustrates a RRBFN online learning process according to an embodiment of the subject invention.

In certain embodiments, the objective is set to minimize the following cost function:

$$E(t) = \frac{1}{2}[\Lambda_d(t) - \hat{\Lambda}_o(t)]^2 = \frac{1}{2}[e(t)]^2 \quad (14)$$

Where E is the error function, $\Lambda_d(t)$ is the desired output, $\hat{\Lambda}_o(t)$ is the actual output for each discrete time t. The gradient-descent adaptation algorithm is employed for updating the weights, center and width of the RRBFN, where $\eta\Theta>0$, $\eta\vartheta>0$, $\eta\sigma>0$ and $\eta p>0$ denote the RRBFN learning rate parameters of the connecting weights, center and width within instant t that regularly decays with time to an insignificant value. FIG. 7 shows the online learning of the RRBFN using the gradient-descent algorithm.

Figure 6:
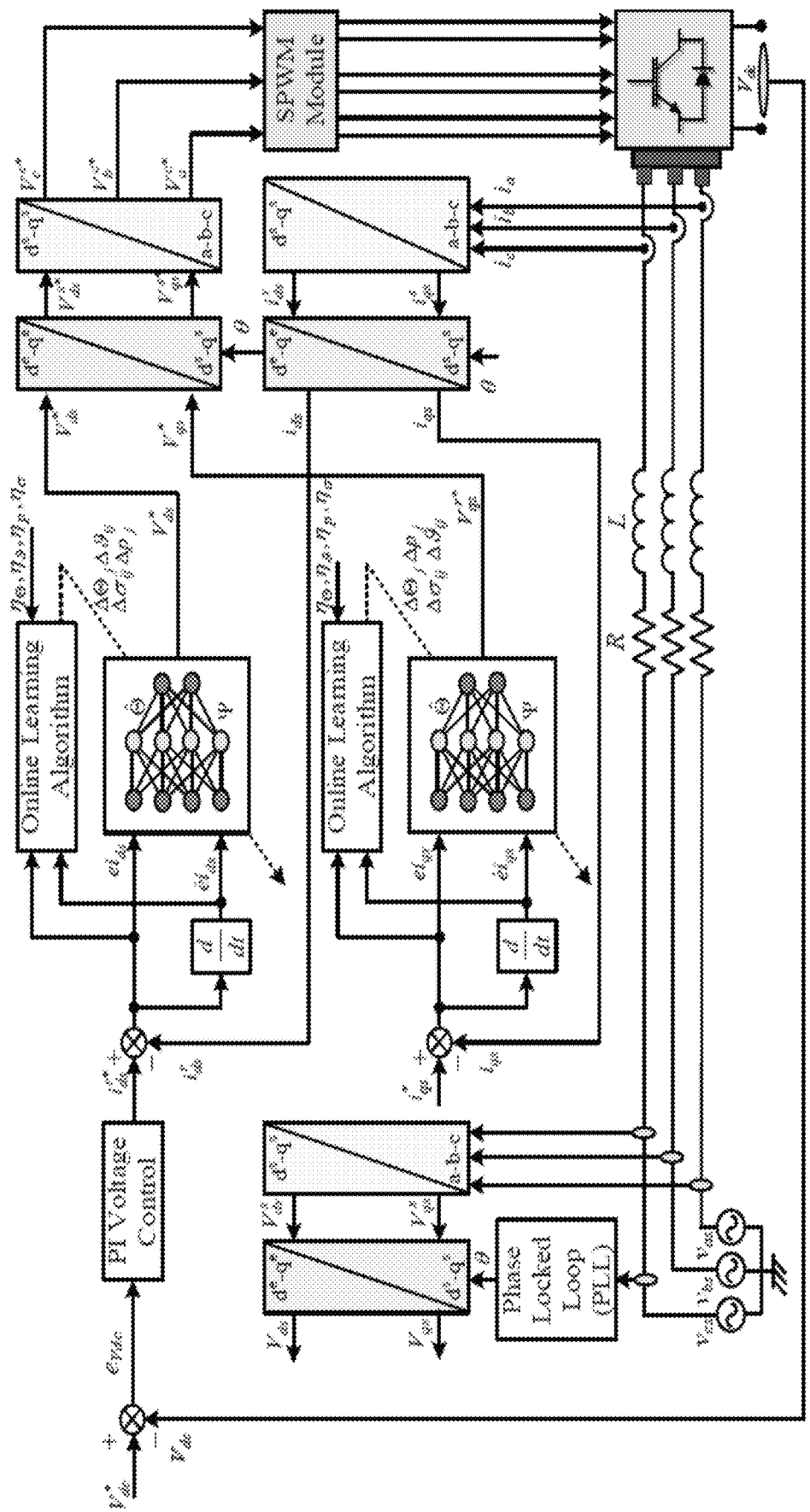
FIG. 6 illustrates a schematic diagram for the provided RANNTC controller according to an embodiment of the subject invention.

As shown in FIG. 6, the provided RANNTC controller in this embodiment is built by adding a conventional PI controller in the outer DC voltage control loop to an inner intelligent neural network controller for both d-q axis currents. The provided controller is trained based on the actual data gathered from the conventional PI during different operating scenarios. A sinusoidal pulse width modulation technique was used at different switching frequencies.

Figure 14:
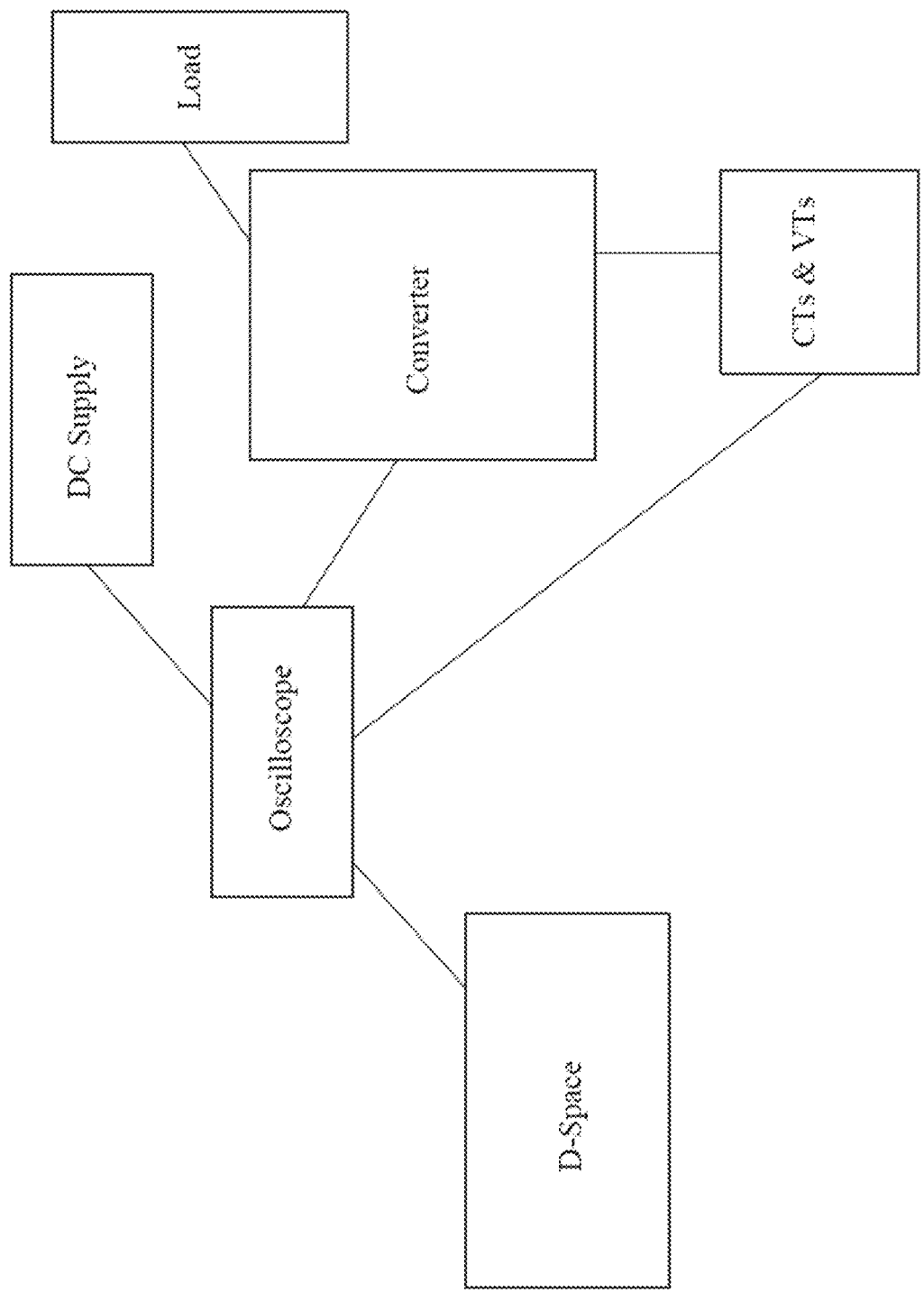
FIG. 14 illustrates the implemented hardware test setup according to an embodiment of the subject invention.

The hardware test results specifications and parameters used are shown in Table 2. The complete setup shown in FIG. 14 has been designed, fabricated, and implemented by the inventors.

TABLE 2

TYPICAL SYSTEM DATA

| Symbol | Quantity | Conversion from Gaussian and CGS EMU to SI |
|---|---|---|
| P | Input Supply | 0-5 kW |
| V | Input Voltage | 3-Ø, 208 v, 60 Hz |
| L | Input Inductor | 30 mH |
| P | Converter Rating | 10 kW |
| C | DC Side Capacitance | 2200 μF |
| V | DC Voltage | 300 V |
| R | DC Resistance | 140 Ω |
| f | Switching Frequency | 5-10 kHz |

A real time simulation is developed and operated alongside with the actual hardware setup using dSPACE 1104. The individual converters are digitally controlled by their own TMS320F28335-based control platforms (Texas Instruments, Dallas, TX.)

In certain embodiments the hardware setup comprises, consists essentially of, or consists of two main circuits. The first one is the main power circuit, while the second is the control circuit. The control circuit has LEM current and voltage sensors (LEM International SA, Meyrin, Switzerland) and a dSPACE 1104 interfaced with MATLAB SIMULINK to implement the real-time vector control. LEM voltage and current transducers measure feedback signals required for control implementation.

Different operation scenarios were conducted to validate the provided RANNTC controller performance.

The inventors have demonstrated the practical differences between both the conventional PI and the provided RANNTC intelligent controller under different operating conditions. These operating conditions included step reference voltage change (increase and decrease) and 50% load step change (increase and decrease).

A. System Performance Against Step Ref. Voltage Change

Figure 15A:
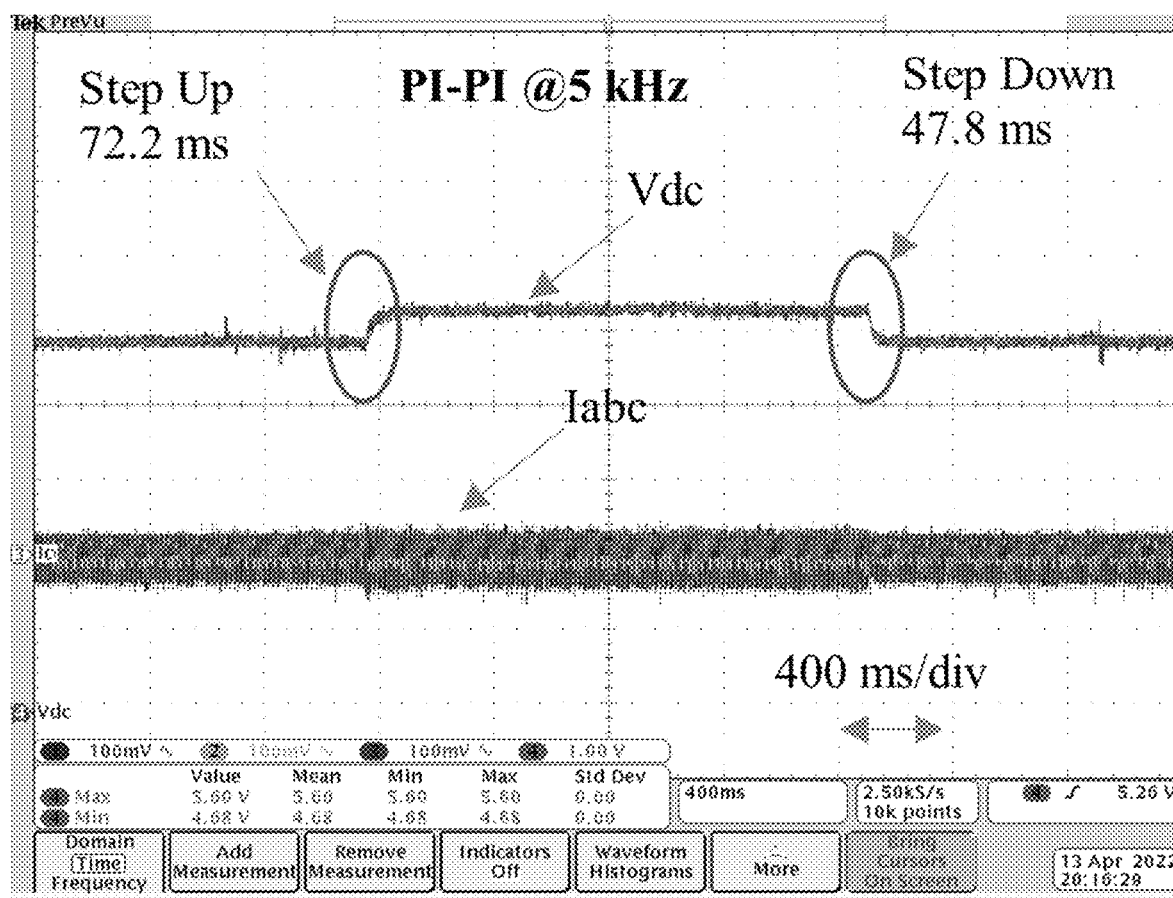
FIGS. 15a and 15b illustrate a step change in DC ref. voltage from 300 v to 325 v to 300 v at Fsw=5 kHz: for (a) conventional PI controller and (b) RANNTC controller according to an embodiment of the subject invention.
Figure 15B:
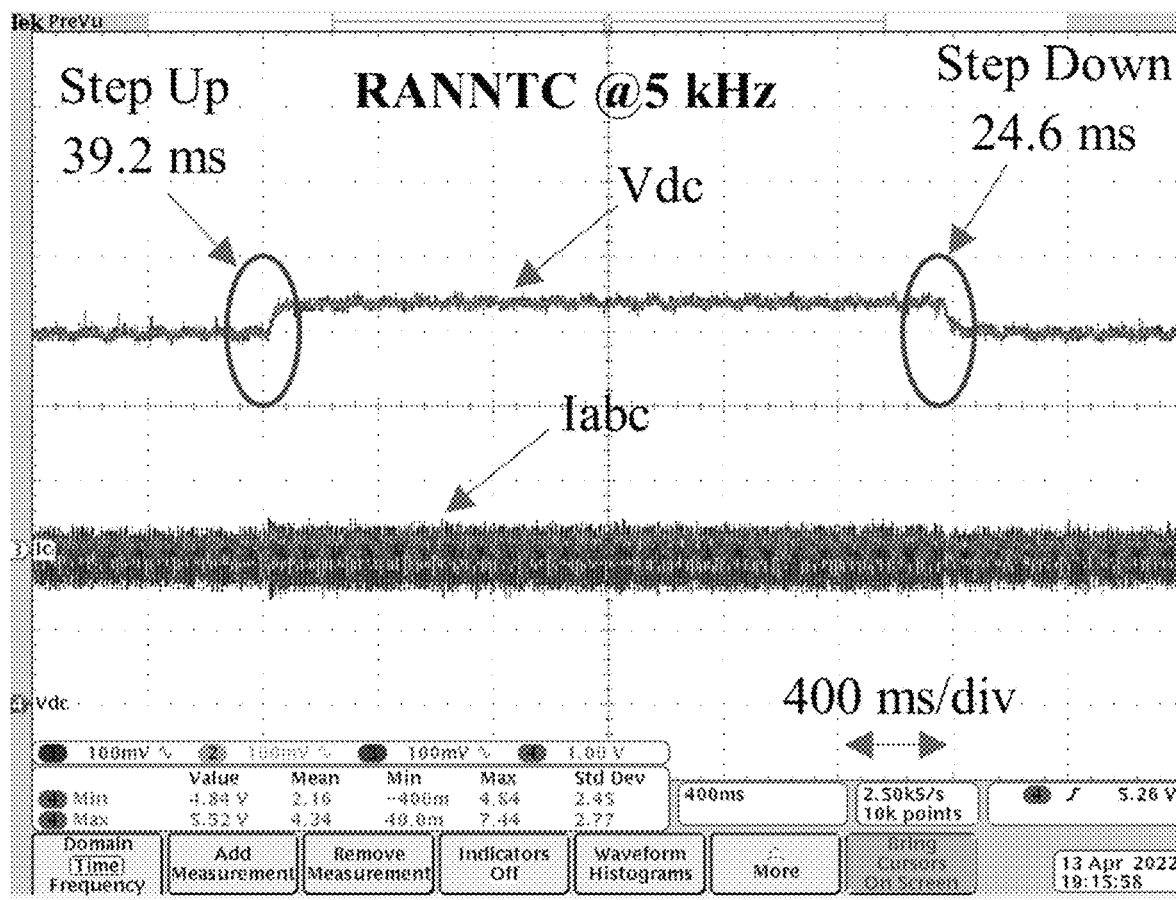
Figure 16A:
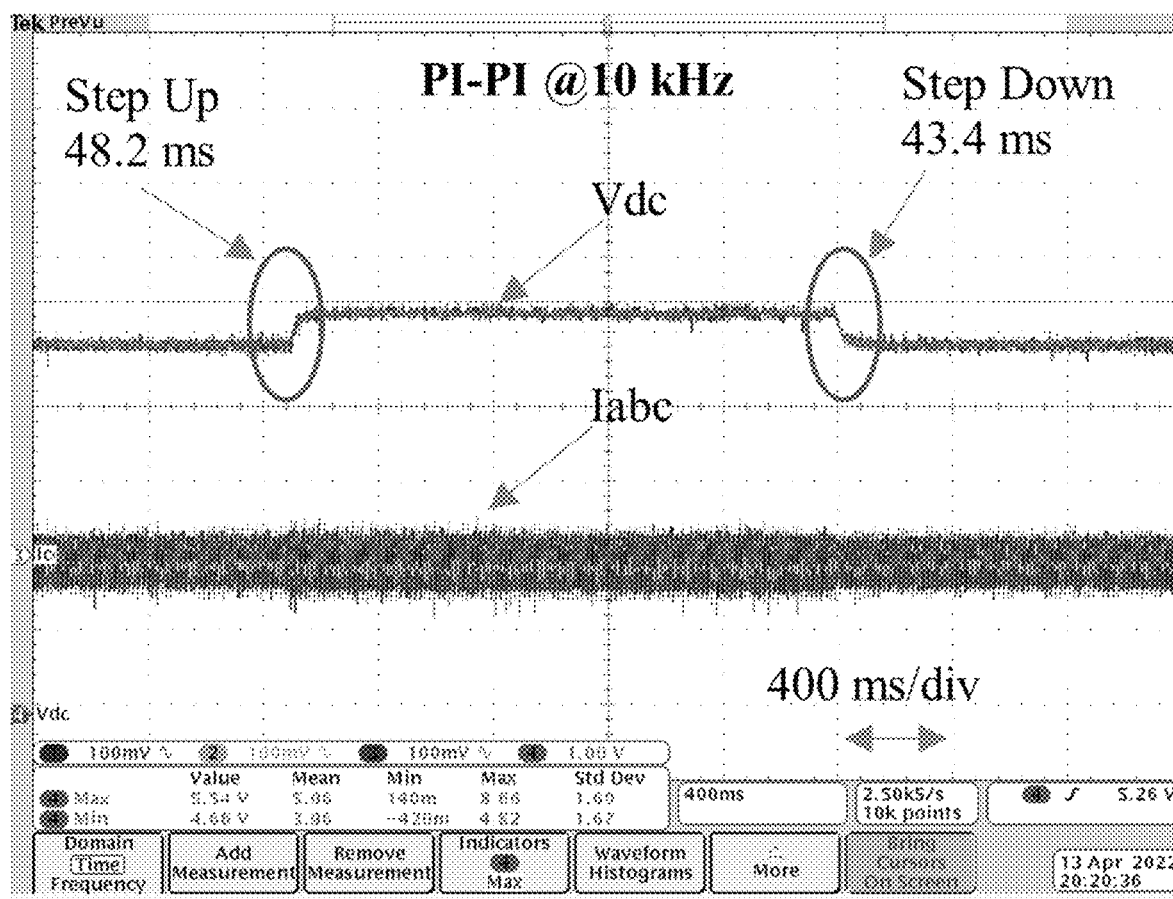
FIGS. 16a and 16b illustrate a step change in DC ref. voltage from 300 v to 325 v to 300 v at Fsw=10 kHz: for (a) conventional PI controller and (b) RANNTC controller according to an embodiment of the subject invention.
Figure 16B:
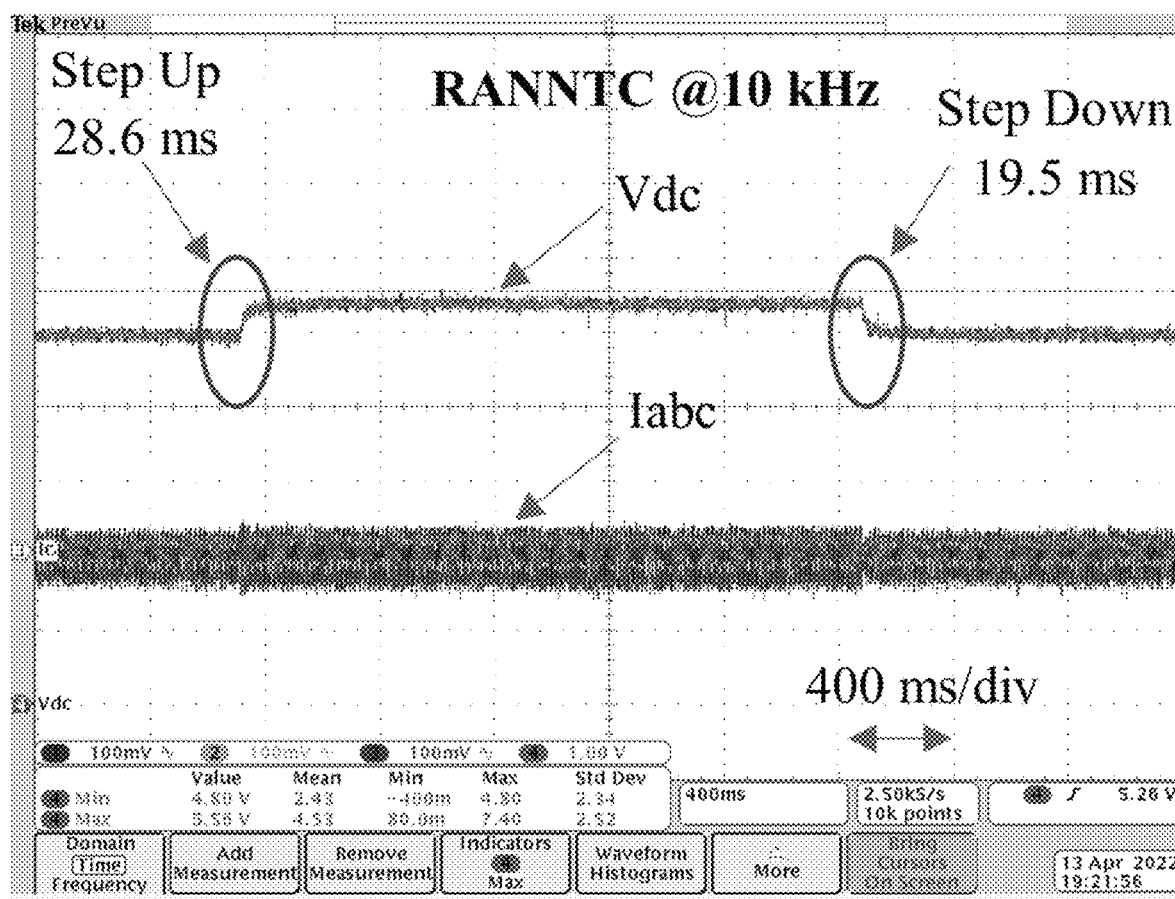

To test one embodiment of the subject invention, after reaching the desired reference level of the DC voltage, the different controllers were tested against step change of the DC voltage level to check each controller's performance. FIGS. 15a and 15b show the system behavior when changing the DC reference voltage level from 300 v to 325 v and then back to 300 v at 5 kHz. FIGS. 16a and 16b show the system behavior when controlled at a 10 kHz switching frequency using PI and the provided RANNTC controllers respectively.

It was noticed from actual hardware measurements that it took the controller 47.8 milliseconds (ms) to step down from 325 Volts (V) and reach the desired ref. level of 300 V. With 10 kHz, the provided RANNTC controller was only 19.5 ms to reach the desired reference DC voltage.

It was noticed that the best performance was obtained when using the provided RANNTC with 10 kHz and hence a 60% reduction in the settling time compared to the conventional PI at 5 kHz.

B. System Performance Against Step Load Change

Figure 17A:
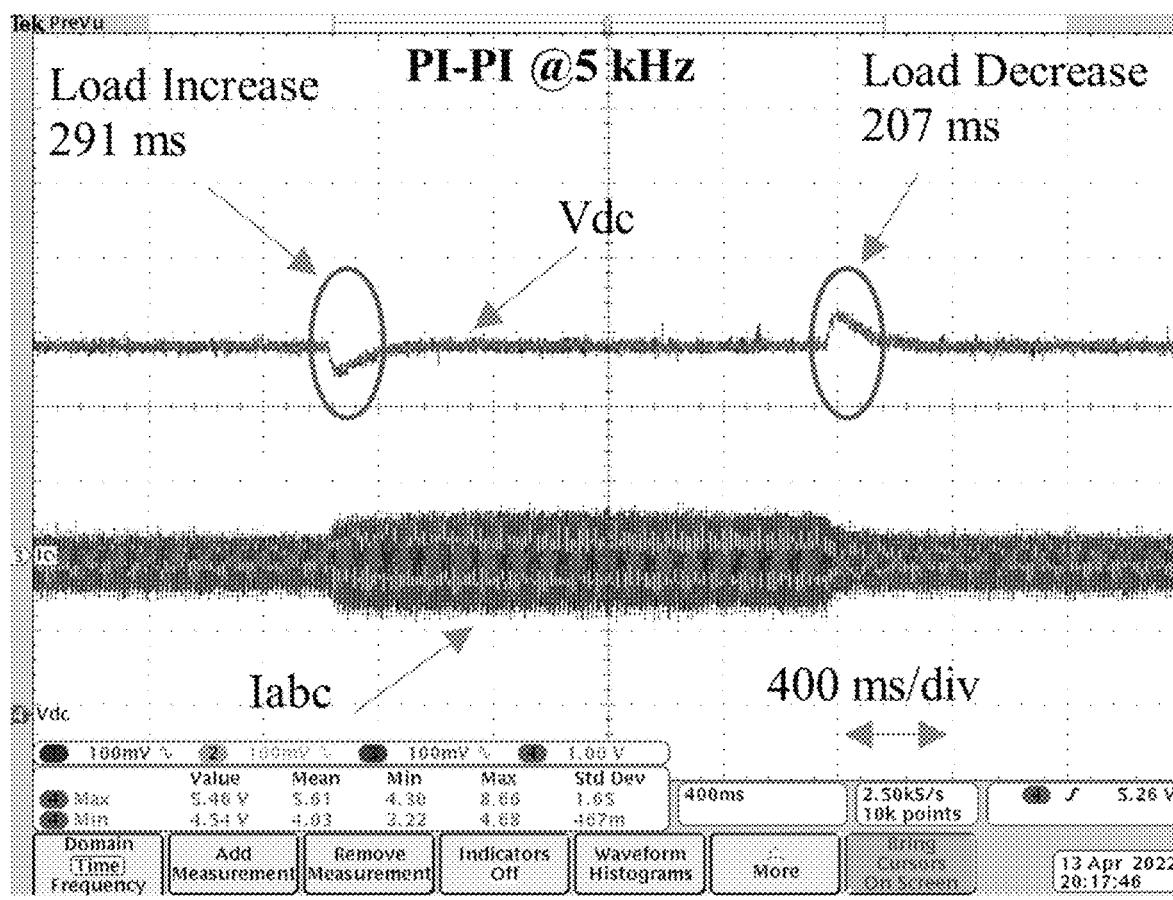
FIGS. 17a and 17b illustrate a step change in DC load from 140Ω to 70Ω to 140Ω at Fsw=5 kHz: for (a) conventional PI controller and (b) RANNTC controller according to an embodiment of the subject invention.
Figure 17B:
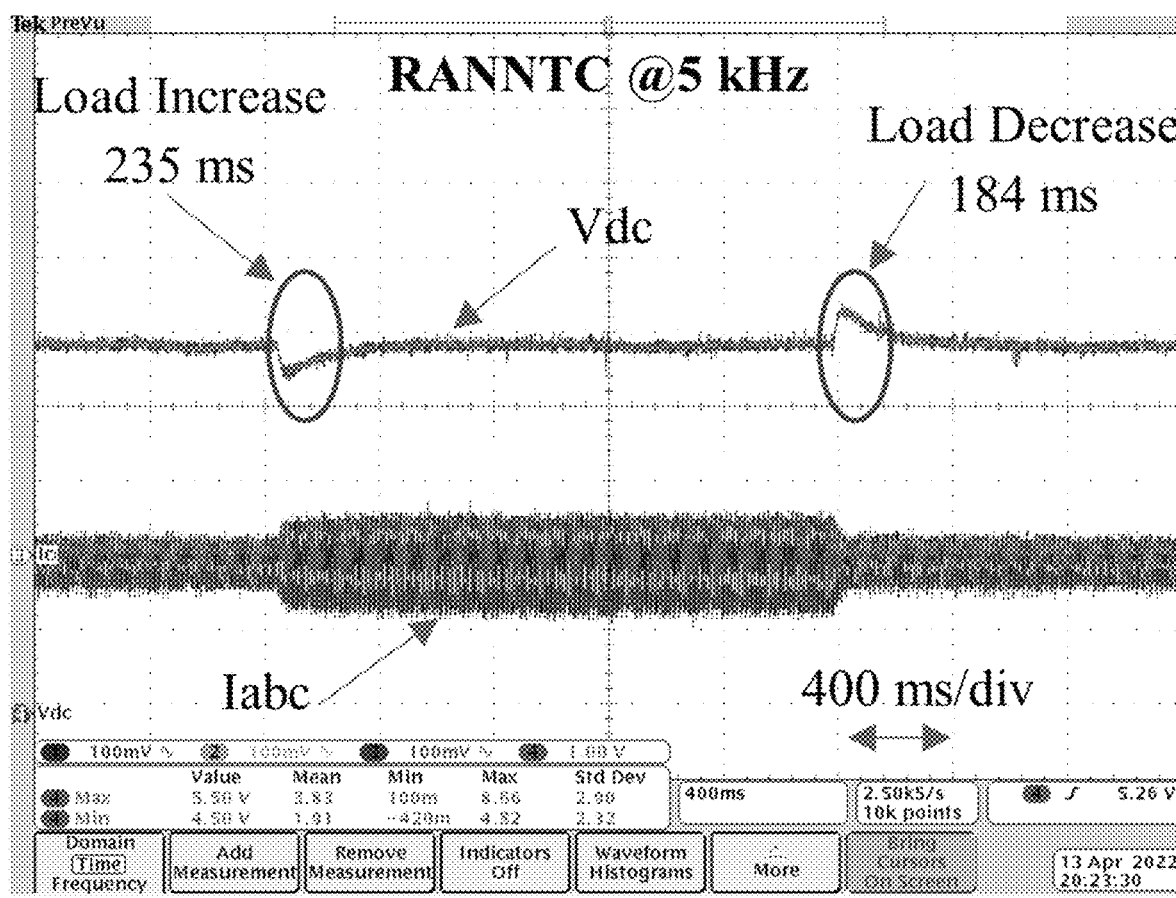

The DC side load is suddenly increased by 100% through reducing the load resistance from 140Ω to 70Ω. Then the load decreased by 50% through increasing the load resistance back from 70Ω to 140Ω as shown in FIGS. 17a and 17b for 5 kHz and FIGS. 18a and 18b for 10 kHz.

V. Performance Evaluation of the RANNTC

In this section, a complete comparison is presented between the different controllers. An embodiment of the provided RANNTC controller was compared with a conventional PI controller for performance evaluation. Table 3 summarizes the actual hardware experimental results comparative analysis conducted as an output of this study.

Figure 19A:
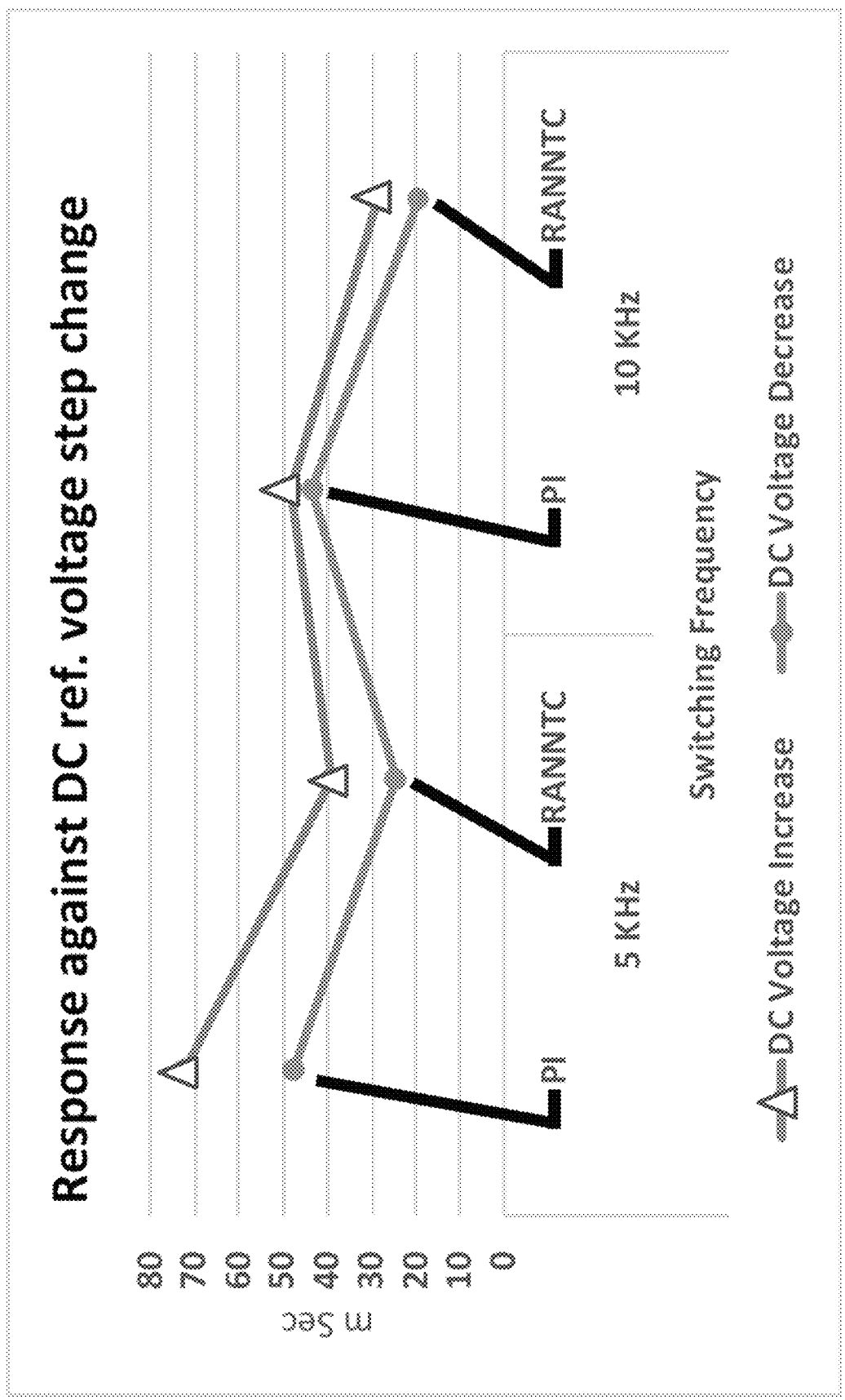
FIG. 19a illustrates a summary of response against DC reference voltage step change increase and decrease for a conventional PI controller and a RANNTC controller according to an embodiment of the subject invention.
Figure 19B:
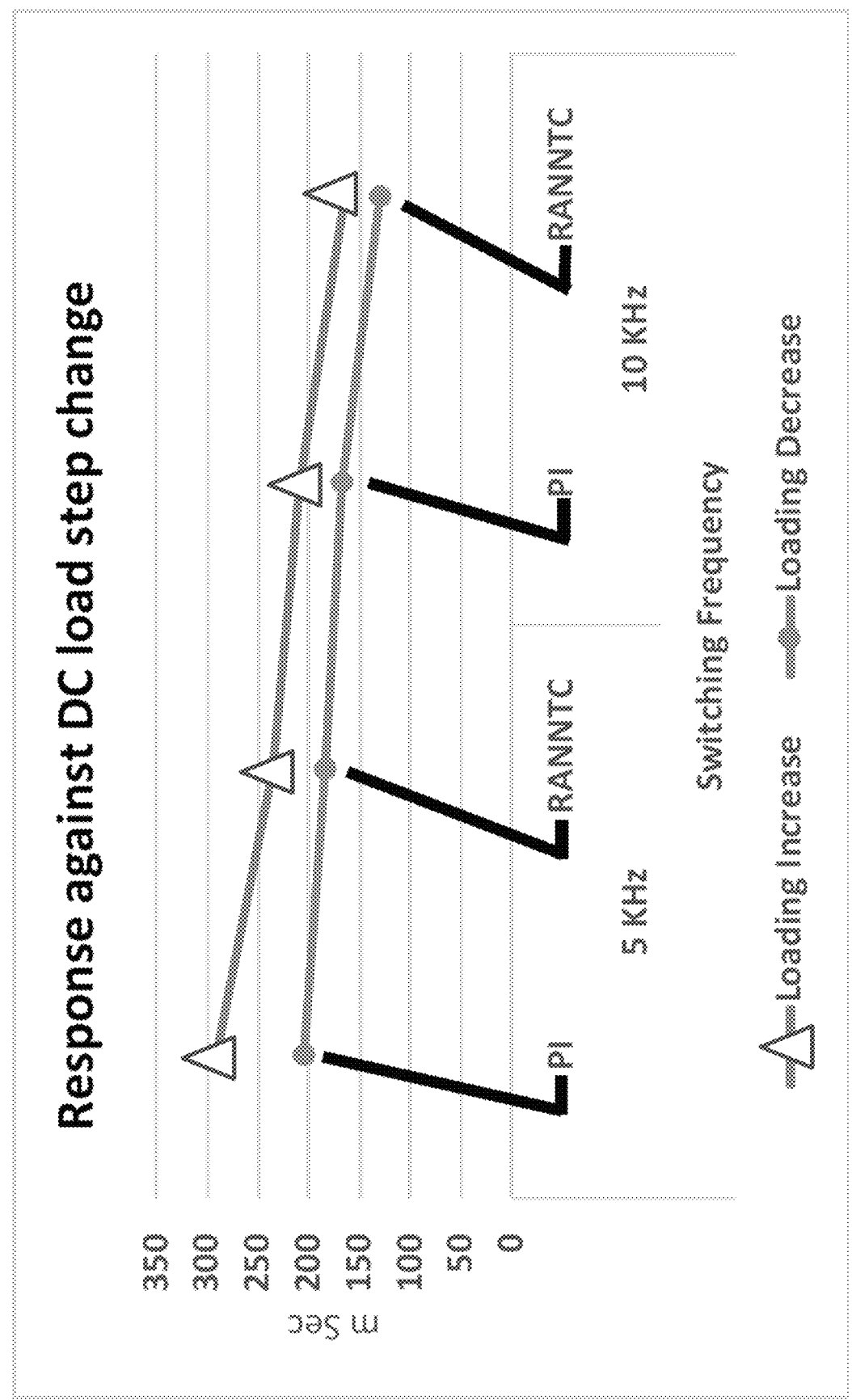
FIG. 19b illustrates a summary of response against DC load step change increase and decrease for a conventional PI controller and a RANNTC controller according to an embodiment of the subject invention.

FIGS. 19a and 19b show the significant enhancement of the transient and steady-state responses of the provided RANNTC intelligent controller. As described, using both PI and the provided RANNTC controllers at a higher switching frequency like 10 kHz gave a better dynamic response with reduced settling time. Also, the provided RANNTC controller had a better performance than that of the conventional PI.

TABLE 3

Experimental Results Comparison

| | | Controller Performance | | | |
|---|---|---|---|---|---|
| | | 5 kHz | | 10 kHz | |
| Condition | | PI | RANNTC | PI | RANNTC |
| Start UP | | 2.478 s | 0.377 s | 1.882 s | 2.478 s |
| Ref. DC | Step Up | 72.2 ms | 39.2 ms | 48.2 ms | 72.2 ms |
| Voltage | Step Down | 47.8 ms | 24.6 ms | 43.4 ms | 47.8 ms |
| Load | Increase | 291 ms | 235 ms | 209 ms | 291 ms |
| Change | Decrease | 207 ms | 184 ms | 167 ms | 207 ms |

Embodiments of the subject invention provide an AC/DC converter with an emulating distributed generation (DG) unit connected to an energy storage system (ESS) as analyzed below in Example 1. A complete mathematical model representation was developed for the grid-connected converter. Standard vector control was introduced along with its complete structure and mathematical model. The inventors have tested the provided controller's dynamic and steady-state performance with respect to the conventional related art controllers. The system performance has been tested against load disturbances and different AC input voltage variations.

A comparison has been conducted between conventional PI controllers and the provided RANNTC intelligent controller according to an embodiment of the subject invention. The performance of the provided RANNTC controller has been determined to be better than the related art conventional PI-PI controller in terms of dynamic response after being subjected to disturbances. Different operating scenarios have been investigated using a test system. These scenarios included DC voltage step change, and different loading conditions. The provided controller exhibited faster and more robust response against disturbances and enhanced performance when compared to the related art conventional controller in dynamic and steady-state responses. Test results have been verified using a MATLAB simulation and hardware experiments. A comparative analysis has been performed to highlight the enhancement and improvement of the system using the provided RANNTC controller. Embodiments of the subject invention provide a reliable power system where the power can flow smoothly between AC and DC sides during normal and abnormal operating scenarios.

Embodiments of the subject invention address the technical problem of controlling a microgrid converter being complex and challenging given the capabilities of related art systems, and acknowledged shortcomings in performance. This problem is addressed by providing digital control and processing with a new controller based on a novel Robust Artificial Neural Network Tracking Control (RANNTC) controller, in which a machine learning method applying a combination of advanced techniques is utilized to better control a microgrid adapter.

When ranges are used herein, combinations and subcombinations of ranges (e.g., subranges within the disclosed range) and specific embodiments therein are intended to be explicitly included. When the term "about" is used herein, in conjunction with a numerical value, it is understood that the value can be in a range of 95% of the value to 105% of the value, i.e., the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A nomenclature table is provided below (presented within Example 1 for spacing reasons) showing abbreviations and symbols used herein.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1: Modeling, Simulation, Test, Implementation, and Performance Evaluation of a RANNTC According to an Embodiment of the Subject Invention In this example, a study for conventional nested loop PI controller was introduced for both outer and inner loops PI-PI controller. A novel RANNTC controller according to an embodiment of the subject invention was then proposed. This embodiment provided a Proportional Integral Neural Network (PI-NN) that enhanced the system performance in terms of dynamic and steady-state responses. A comparison between the related art traditional PI-PI controller and the novel RANNTC controller was made under different operating scenarios. The converter control was tested under various operational conditions, and its dynamic and steady-state behavior was analyzed. The model was implemented through MATLAB Simulink to check the normal operation of the network in a grid-connected mode under different load disturbances and AC input voltage. Then, the system was designed, fabricated, and implemented in a hardware environment in a physical testbed, and the test results were verified. The results show that the intelligent RANNTC controller according to an embodiment of the subject invention can achieve better performance in both dynamic and steady-state responses, as compared to conventional related art controllers.

| NOMENCLATURE | |
|---|---|
| Parameter | Description |
| R (Ω) | Line resistance in Ohm |
| L (mH) | Line inductance in milli Henry |
| C (µF) | DC side capacitance in micro-Farad |
| AC, DC | Alternating and Direct currents |
| $e_{abc}(t)$, $i_{abc}(t)$ | AC line voltages & currents |
| $v_{abc}(t)$ | AC terminal voltages |
| S, P, Q | Apparent, Active and Reactive power |
| A | Park transformation matrix |
| $i_{dc}{}^r(t)$, $i_{dc}(t)$ | DC ref. & measured currents |
| $v_{dc}{}^*(t)$, $v_{dc}(t)$ | DC ref. & measured voltages |
| $v_d$, $v_q$, $i_d$, $i_q$ | d-q voltages and currents |
| $i_d{}^*$, $i_q{}^*$ | Ref. d-q currents |
| $ei_{qs}$, $ei_{ds}$ | d-q current error signals |
| $e_{Vdc}$ | DC voltage error signal |
| $F_{sw}$ | Switching frequency in kHz |
| $K_p$, $K_i$ | Proportional and integral gains |
| $T_v$ | Filter time constant |
| ξij | Given input vector |
| $\Lambda_0^{(3)}(t)$ | Output vector of the RRFBN |
| $\Theta_j(t)$ | Adaptable weight vector |
| $\Psi_j(t)$ | Self-feedback gain of the hidden layer |
| $\sigma_{ij}(t)$, $\vartheta ij(t)$ η, | Width & center of the $\Psi_j$ vector |
| ση, ϑη, Θηp η, | RRBEN Learning rate parameters |
| m | Hidden neurons, input variable numbers |
| ANN | Artificial Neural Network |
| RANNTC | Robust ANN Tracking Control |
| RRBFN | Recurrent Radial Bases Function N.N |
| PR | Proportional Resonant |
| SMC | Sliding Mode Control |
| SPWM | Sinusoidal Pulse Width Modulation |
| PLL | Phase Locked Loop |
| $\Lambda_d(t)$ | Desired output vector |

NOMENCLATURE

| Parameter | Description |
|---|---|
| $\dot{A}_o(1)$ | Actual output vector |
| DAC | Digital to Analogue Converter |
| ADC | Analogue to Digital Converter |

The sections of this example are organized as follows: Section I describes a complete converter mathematical system model with different controllers; section II shows the study of tuning PI controllers and the Neural Network training process; section III shows the obtained simulation results under different loading scenarios with parameter disturbances; section IV has the hardware test results; section V shows the performance evaluation of the provided controller and section VI describes conclusions of this example.

I. System Model

As shown in FIG. 1, a simple structure of a microgrid is illustrated. The operation of this microgrid was done in two main different modes. The first mode was defined as a grid-connected mode. In this mode, the main AC source was the host grid. Assuming that the microgrid was connected to an infinite bus with a minimum impedance. The other mode was an OFF-grid system, where the main AC source was coming from the AC generators that were located at the physical testbed. In this case, the AC source had a higher impedance than the one of the grids which increased the voltage drop across the line filter and reduced the 3-Ø voltage level at the rectifier input terminals.

In FIG. 2, an AC source with a balanced 3 phase voltage of amplitude E and frequency f was feeding RL load through a 2 level 3-phase full-wave IGBT-based converter acting as a rectifier. R and L represent the resistance and inductance connected between the AC supply and the converter AC terminals. In equation (1), phase voltages of the AC source are $e_a$, $e_b$ and $e_c$.

$$e_a(t) = E \sin(\omega t)$$

$$e_b(t) = E \sin(\omega t - 2\pi/3) \quad (1)$$

$$e_c(t) = E \sin(\omega t - 2\pi/3)$$

The dynamic equation describing the system is given in equation (2), where $v_{abc}$ is the phase voltage at the converter's AC terminal.

$$e_{abc}(t) - v_{abc}(t) = L\frac{di_{abc}(t)}{dt} + R\, i_{abc}(t) \quad (2)$$

Referring to FIG. 1 and for the output DC side, the dynamic equation of the output side can be expressed as equation (3)

$$i_c(t) = i_{dc}(t) - i_L(t) = C\frac{dv_c(t)}{dt} \quad (3)$$

The line voltages and phase currents can be represented in the d-q synchronous frame by applying the Park's Transformation matrix to the abc voltage and current components as per equation (5).

$$v_{dq}(t) = A \cdot v_{abc}(t) \quad (4)$$

$$i_{dq}(t) = A \cdot i_{abc}(t) \quad (5)$$

where A is the transform matrix. Equations (6) and (7) represent the system's dynamic model of the d-q reference frame.

$$v_d(t) = e_d(t) - L\frac{di_d(t)}{dt} - R\, i_d(t) + L\omega i_q(t) \quad (6)$$

$$v_q(t) = e_q(t) - L\frac{di_q(t)}{dt} - R\, i_q(t) + L\omega i_d(t) \quad (7)$$

We notice that coupling terms in eq. (6), (7) appear; these terms degrade the dynamic performance of the system. For achieving a fully decoupled control, these coupling terms can be eliminated using the vector control technique. This can allow control of each current component independently without any effect on the other current components. This will allow control of voltage, P and Q independently.

Active and reactive powers can be written as follows in abc reference frame:

$$S = P + jQ = V \cdot I^* \quad (8)$$

And in d-q reference frame:

$$P = \frac{3}{2}[v_d i_d + v_q i_q] \quad (9)$$

$$Q = \frac{3}{2}[v_q i_d - v_d i_q] \quad (10)$$

for a unity power factor operation and a balanced case, the q-component of voltage was set to be zero. So, DC voltage and active power can be directly controlled by d-axis current component ($i_d$), while reactive power can be easily controlled via q-axis current component ($i_q$).

$$P = \frac{3}{2}[v_d i_d]. \text{ and } Q = \frac{3}{2}[-v_d i_q]$$

For the DC side, since the input power almost equals to the output power (neglecting the converter losses):

$$P(t) = v_{dc}(t) \cdot i_{dc}(t) \quad (11)$$

$$i_{dc} = \frac{3v_d(t)}{2v_{dc}(t)} \cdot i_d(t) \quad (12)$$

The d-q current components could be oriented to control the operation of the converter using inner current control loops. Therefore, the system's performance depends on the robustness of the applied control. The main elements of the controller are discussed below.

II. Modeling and Tuning of the Converter's Control

In this section, the complete mathematical model for the converter voltage and current controllers is presented. The vector control is used with the DC voltage controller and P & Q powers through controlling the d-q currents.

Vector control is a standard method for the grid-connected converters that is commonly used in power system applications and particularly in renewables integration. It can comprise or consist essentially of two nested control loops, as shown in FIG. 3, a faster inner current control loop and a slower outer control loop. The outer loop could be a voltage control or active and reactive power control. In FIG. 3, DC voltage is controlled through the d-axis current component. At the same time, the q-axis current present component can be used to control reactive power to support the grid voltage or controlled at zero to operate the power converter at a unity power factor. Despite the decoupling terms, it has been found that the generated signals from d-q axis PI controllers are not contributing correctly in terms of the objectives of decoupled d-q control. Although the compensation terms are included in FIG. 3, they don't contribute to the principle of feedback control. Hence, this control has a competing control nature. There are some limitations related to conventional standard vector control. One of these is that standard vector control approaches may behave improperly especially when the converter operates beyond its PWM saturation limit. Additionally, conventional standard vector control is very sensitive to model uncertainties.

A. Inner Loop Current Controller

The inner controller is used to regulate the d-q currents through a PI controller as shown in FIG. 3. This loop contains two current controllers. Formulating the control model through next equations:

$$\frac{d\gamma_d}{dt} = i_d^* - i_d \tag{13}$$

$$\frac{d\gamma_q}{dt} = i_q^* - i_q \tag{14}$$

$$v^r{}_d = e_d(t) + K_p(i^r{}_{ld} - i_{ld}) + K_i\gamma_d + \omega L i_q \tag{15}$$

$$v^r{}_q = e_q(t) + K_p(i^r{}_{lq} - i_{lq}) + K_i\gamma_q + \omega L i_d \tag{16}$$

It's clear that feed-forward components ed(t) and eq(t) are used as shown in eq. (15) and (16).

B. Outer Loop Voltage Controller

A PI controller is used for the outer loop. This controller gives the d-axis current reference value $i^r{}_d$ to the inner loop. The converter DC voltage is controlled by selecting the DC current reference, $i^r{}_{dc}(t)$ such that:

$$i^r{}_{dc}(t) = K_p(V^*{}_{dc} - V_{dc}) + K_i \int [V^*{}_{dc} - V_{dc}] \tag{17}$$

where $V^*{}_{dc}$ is the desired voltage, $K_p, K_i$ are the PI parameters.
From equation (15), thus:

$$i^r{}_d = \frac{2v_{dc}(t)}{3v_d(t)} \cdot i^r{}_{dc} \tag{18}$$

FIG. 4 shows the voltage controller simulated response against a step-change in the DC side voltage from 300 to 325 to 300 v at t=3 sec and 7.5 sec respectively, using the conventional PI and the provided RANNTC controller according to an embodiment of the subject invention.

C. Conventional PI Controller Tuning

The tuning procedure for the conventional current controller is introduced in this part. Certain embodiments consider the converter's PWM delay to tune the inner current controller parameters shown in FIG. 3. This delay effect is approximated with a first-order transfer function. Equations 19 and 20 define the current controller transfer function.

$$H(S) = \left(K_p + \frac{K_i}{S}\right) \cdot \left(\frac{1}{1 + T_v S}\right) \cdot \left(\frac{1}{r(1 + T \cdot S)}\right) \tag{19}$$

$$T = \left(\frac{L}{R}\right), T_v = \left(\frac{1}{2f_{sw}}\right) \tag{20}$$

The widely used Modulus Optimum (MO) criterion can be applied to select the PI controller gains based on an open-loop transfer function. This technique is done through pole cancellation in the open loop transfer function. In the closed-loop transfer function, critical damping can then be obtained by properly selecting of the gain using equation (21).

$$K_p = \left(\frac{L}{2\omega T_v}\right), K_i = \left(\frac{r}{2T_v}\right) \tag{21}$$

This tuning approach can be extended to include the delay effect of the discrete-time implementation and sampling effects. The controller bandwidth is about 1 kHz. Table 4 shows the different control parameters used in both simulation and hardware setup for the conventional PI-PI controller.

TABLE 4

System Control Parameters

| | Control Loop | PI K_p | PI K_i | Sampling Period (μs) | Region of controllability |
|---|---|---|---|---|---|
| Simulation | Voltage Loop | 0.1 | 1 | 500 | 70-300 Ω |
| Hardware | Current Loop | 40 | 200 | 500 | 70-300 Ω |
| | Voltage Loop | 0.1 | 1 | 10 | 60-300 Ω |
| | Current Loop | 40 | 200 | 10 | 60-300 Ω |

In the following parts, and in comparison to related art work, this example presents a detailed control structure and learning methodology of the provided control system according to an embodiment of the subject invention.

Additionally, a detailed experimental validation of the provided control scheme is provided within a complete hardware environment. Finally, a performance comparison study is presented.

D. Novel RANNTC Control

Mapping between a nonlinear input-output can be easily done using a Neural Network. A neural network can be trained and tuned offline or online for a particular application. Selecting the optimal weights is called training the neural network. In related art, an offline learning using a huge, generated data set from conventional PI controller was used to train the neural network and this required high computational capabilities. In other related art, an online learning-based ANN was introduced where hidden output vector of the NN was updated online till reaching convergence. The provided RANNTC control was developed using the online learning approach, according to an embodiment of the subject invention. FIG. 4 shows simulation comparison between the conventional PI-PI and the novel RANNTC controller against step-change test. As shown in FIG. 6, the novel RANNTC controller was built by adding a conventional PI controller in the outer DC voltage control loop to ANN based controllers for both d-q axis currents. A sinusoidal pulse width modulation technique was used at different switching frequency levels.

E. RRBFN Model

Figure 5:
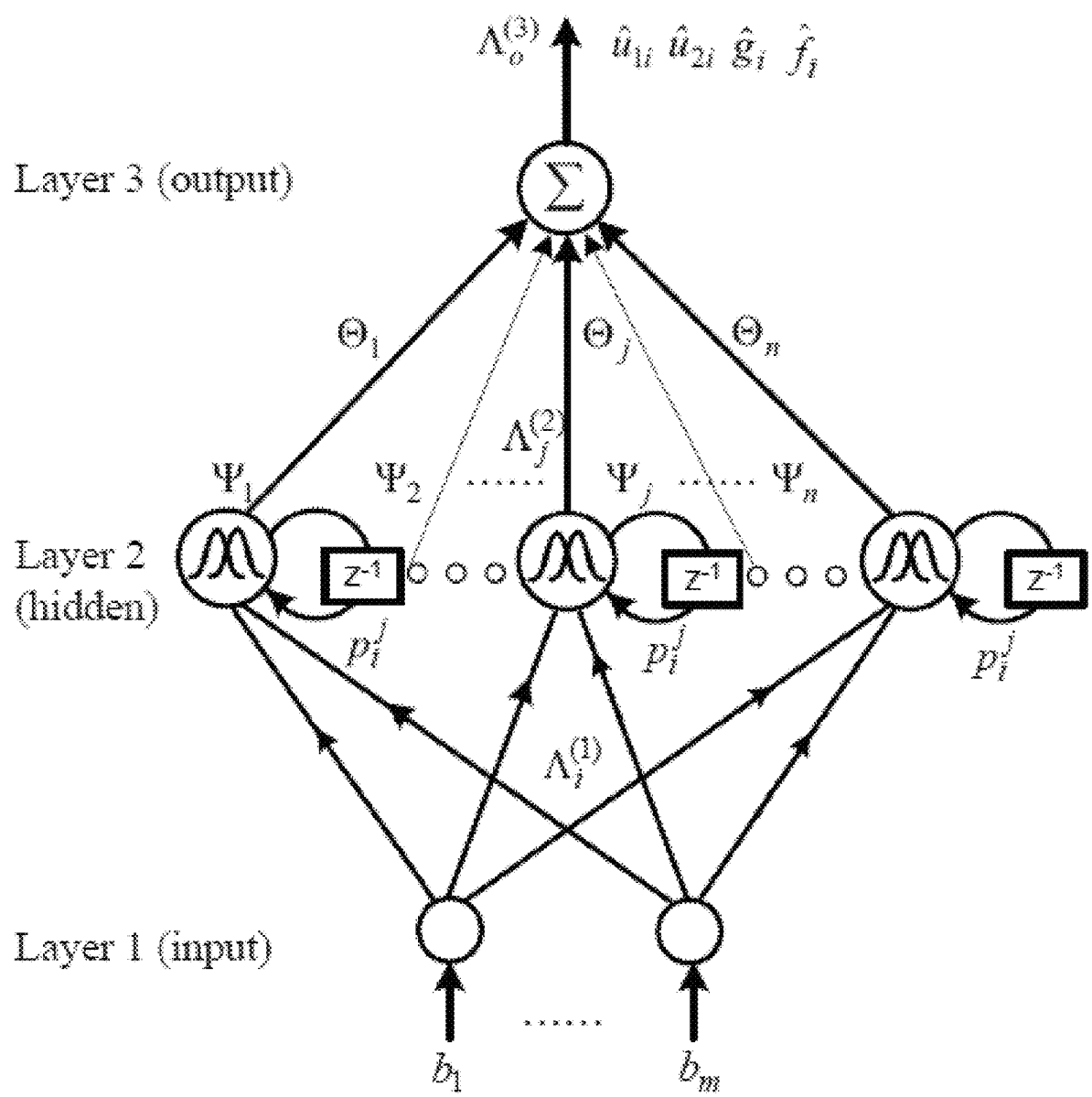
FIG. 5 illustrates a RRBFN structure according to an embodiment of the subject invention.

A three-layer RRBFN was developed to implement the RRBFN estimators and improve the function approximation accuracy. The structure of the RRBFN involves an input, hidden along with the output layer as shown in FIG. 5. In addition, the Gaussian function can be employed as the activation function in the hidden layer because of its differential and continuous features. For a given input $\xi_{ij}=[b1j \ldots bmj]^T$, the output of the RRBFN is represented as:

$$\Lambda_o^{(3)}(t) = \sum_{j=1}^{n} \Theta_j(t)\Psi_j(t) \quad (22)$$

$$\Psi_j(t) = \exp\left[-\sum_{i=1}^{m}\left(\frac{(\xi_i(t)+\Psi_j(t-1)P_j - \vartheta_{ij}(t))^2}{2[\sigma_{ij}(t)]^2}\right)\right] \quad (23)$$

where $\Theta_j(t)$ is the weight from the hidden to output layer; $\Psi_j$ is the output of the hidden layer; the vector $\vartheta_{ij}=[\vartheta 1j \ldots \vartheta mj]$ is the center of the $\Psi_j(t)$, $p_j$ is the self-feedback gain of the hidden layer; $\sigma_{ij}$ is the width of the $\Psi_j$, $\sigma_{ij}=[\sigma 1j \ldots \sigma mj]$, $(j=1, \ldots, n)$, n is the number of hidden neurons; $(i=1, \ldots, m)$, m is the number of input variables. Then, the output vector of the RRBFN can be expressed as:

$$\Lambda_o(\xi,\vartheta,\sigma,p,\Theta)=\Theta^T\Psi(\xi,\vartheta,\sigma,p) \quad (24)$$

where $\Theta_j=[\Theta 1 \ldots \Theta n]^T$ is the adaptable weight vector between the hidden and output layers; $\Psi_j=[\Psi 1 \ldots \Psi n]^T$ is the output vector of the hidden layer. In the training process, the center and width of the hidden neurons will be tuned using the training samples.

F. RRBFN Training via Gradient-Descent Algorithm

The objective is to minimize the following cost function:

$$E(t) = \frac{1}{2}[\Lambda_d(t) - \hat{\Lambda}_o(t)]^2 = \frac{1}{2}[e(t)]^2 \quad (25)$$

where E is the error function, $\Lambda_d(t)$ is the desired output, $\hat{\Lambda}_O(t)$ is the actual output for each discrete time t. The gradient-descent adaptation algorithm is employed for updating the weights, center, and width of the RRBFN. The update laws for the RRBFN parameters are given by:

$$\Delta\Theta_j(t) = -\eta_\Theta \frac{\partial E(t)}{\partial \Theta_j(t)} \quad (26)$$

$$\Delta p_j(t) = -\eta_p \frac{\partial E(t)}{\partial p_j(t)} \quad (27)$$

$$\Delta\vartheta_{ij}(t) = -\eta_\vartheta \frac{\partial E(t)}{\partial \vartheta_{ij}(t)} \quad (28)$$

$$\Delta\sigma_{ij}(t) = -\eta_\sigma \frac{\partial E(t)}{\partial \sigma_{ij}(t)} \quad (29)$$

The weights, center and width can be updated as follows:

$$\Theta_j(t+\Delta t)=\Theta_j(t)+\Delta\Theta_j(t) \quad (30)$$

$$p_j(t+\Delta t)=p_j(t)+\Delta p_j(t) \quad (31)$$

$$\vartheta_j(t+\Delta t)=\vartheta_j(t)+\Delta\vartheta_j(t) \quad (32)$$

$$\sigma_j(t+\Delta t)=\sigma_j(t)+\Delta\sigma_j(t) \quad (33)$$

where $\eta_\Theta>0$, $\eta_\vartheta>0$, $\eta_\sigma>0$ and $\eta_p>0$ denote the RRBFN learning rate parameters of the connecting weights, center and width within instant t that regularly decays with time to an insignificant value. FIG. 7 shows the online learning of the RRBFN using the gradient-descent algorithm.

III. Simulation Results

MATLAB Simulink was used to simulate the power and control systems. A comparison between the conventional PI-PI and the provided RANNTC controllers was introduced.

Figure 8:
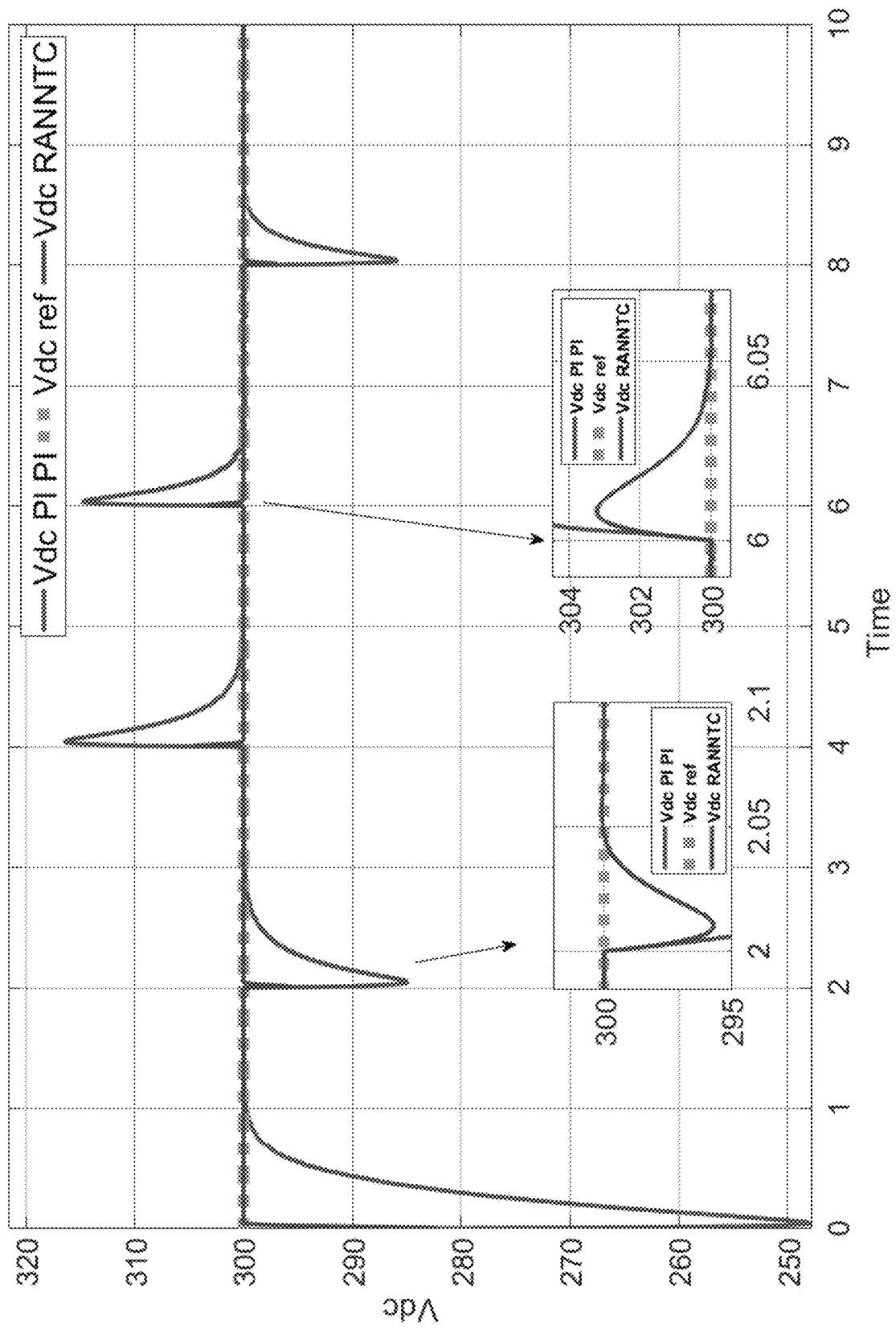
FIG. 8 illustrates a Vdc response against AC input voltage variation according to an embodiment of the subject invention.

As shown in FIG. 8, the different controllers' responses against AC input voltage variation were captured. It was clear that the PI-PI controller had a slower transient response than the provided RANNTC controller according to an embodiment of the subject invention. The inventors analyzed both settling time and variation percentage around the reference value which were better with the provided RANNTC controller. FIG. 9 showed the controllers' responses against different loading conditions that increased in steps from 10 to 100% of the full load. The provided RANNTC controller had superior transient performance over the conventional one that showed poor transient performance.

Generally, embodiments of the provided RANNTC controller had better transient and steady-state performances over the conventional PI-PI controller. This increased the system stability and made the power flow from AC to DC side done smoothly while controlling the DC bus voltage at constant value of 300 v.

Figure 10:
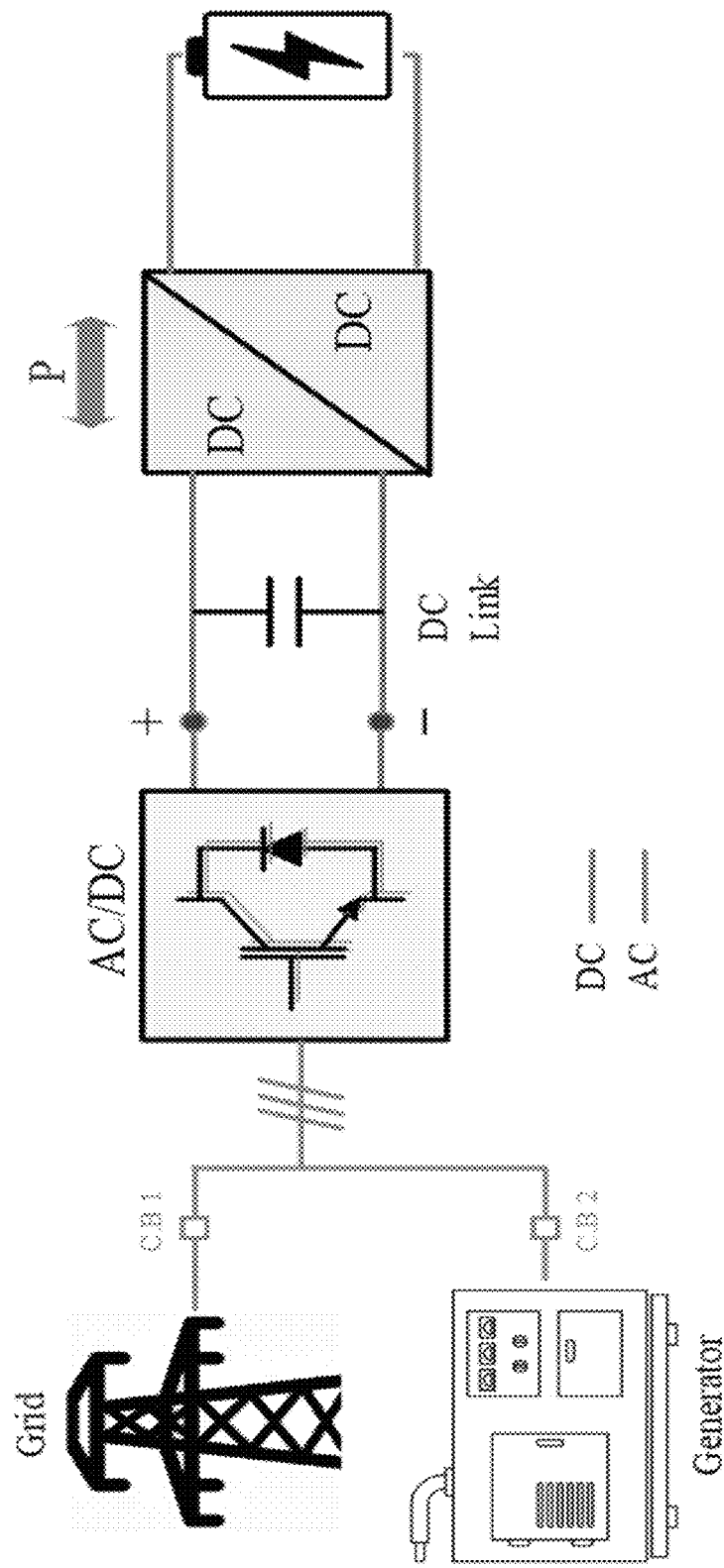
FIG. 10 illustrates a. Battery integration through a DC/DC converter according to an embodiment of the subject invention.

A Battery Energy Storage System was integrated to the DC side and operated in two different states. These states were charging and discharging modes of operation. The battery charging and discharging system is shown in FIG. 10. The system results were presented as follows while using the two different controllers. The battery was connected through a bidirectional DC/DC converter. The buck/boost converter was current controlled to regulate the amount of power injected to or absorbed from the BESS.

Figure 11:
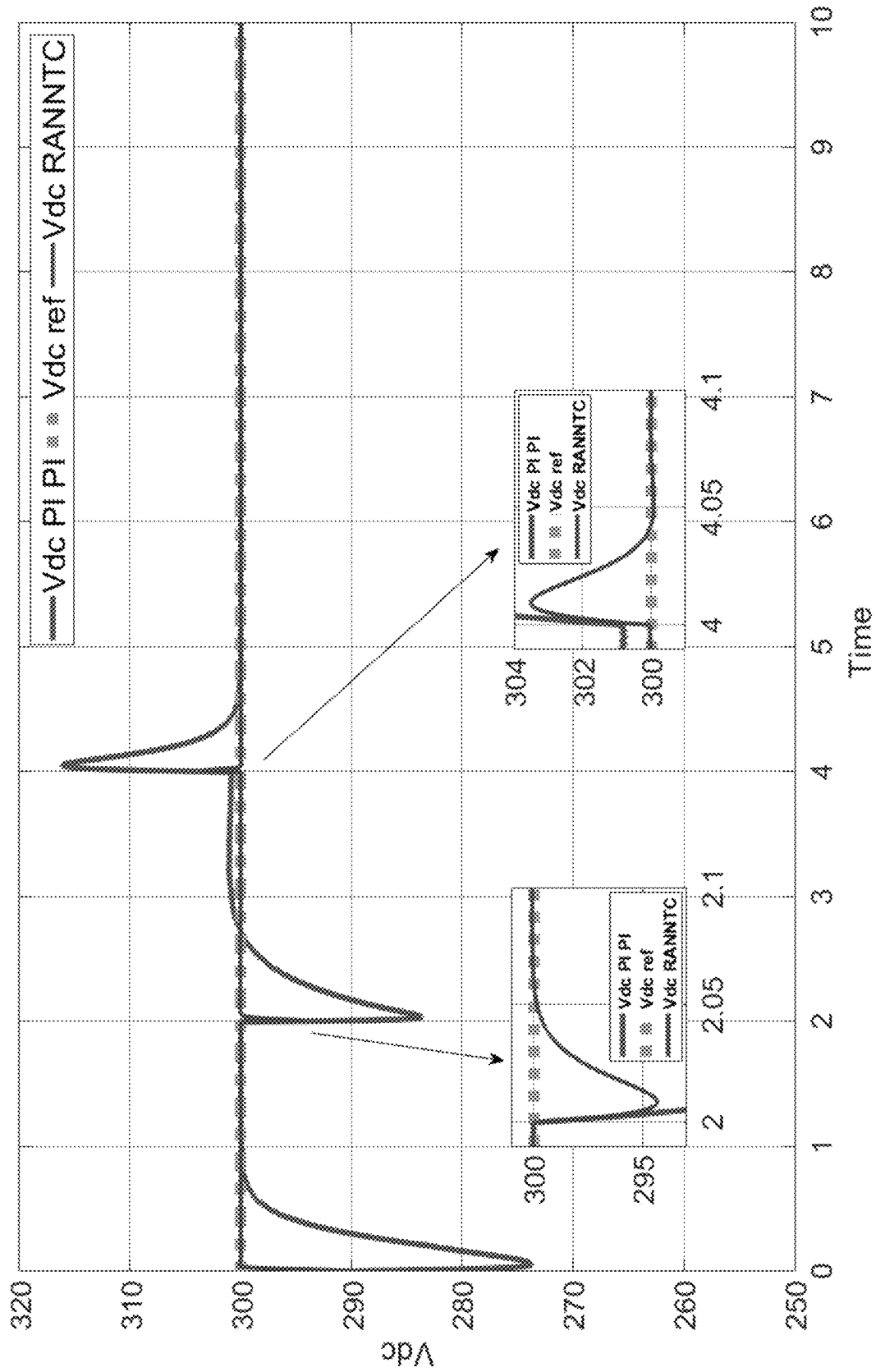
FIG. 11 illustrates a Vdc response while charging the battery according to an embodiment of the subject invention.

Through controlling the current reference of the DC/DC converter, power direction can be controlled in or out of the battery. As shown in FIG. 11, at t=2 sec, the battery (initially 70% SoC) started charging. At t=4 sec, the battery was disconnected from the system.

Figure 12:
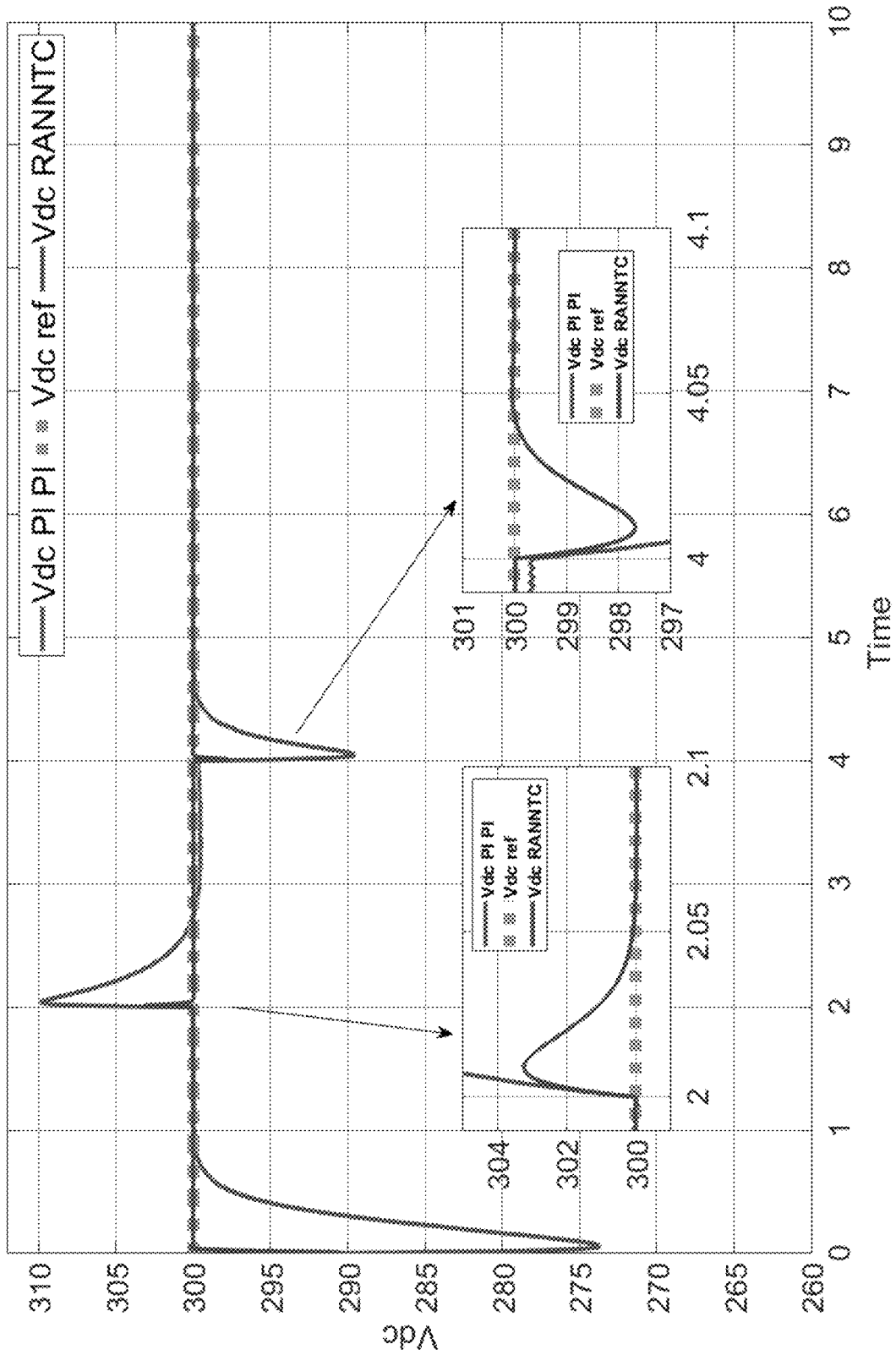
FIG. 12 illustrates a Vdc response while discharging battery.

In FIG. 12, Vdc response was captured while the battery was controlled to discharge at t=2 sec and suddenly disconnected at t=4 sec. Again, the results confirm the better performance of the provided RANNTC controller over the PI-PI.

Figure 13A:
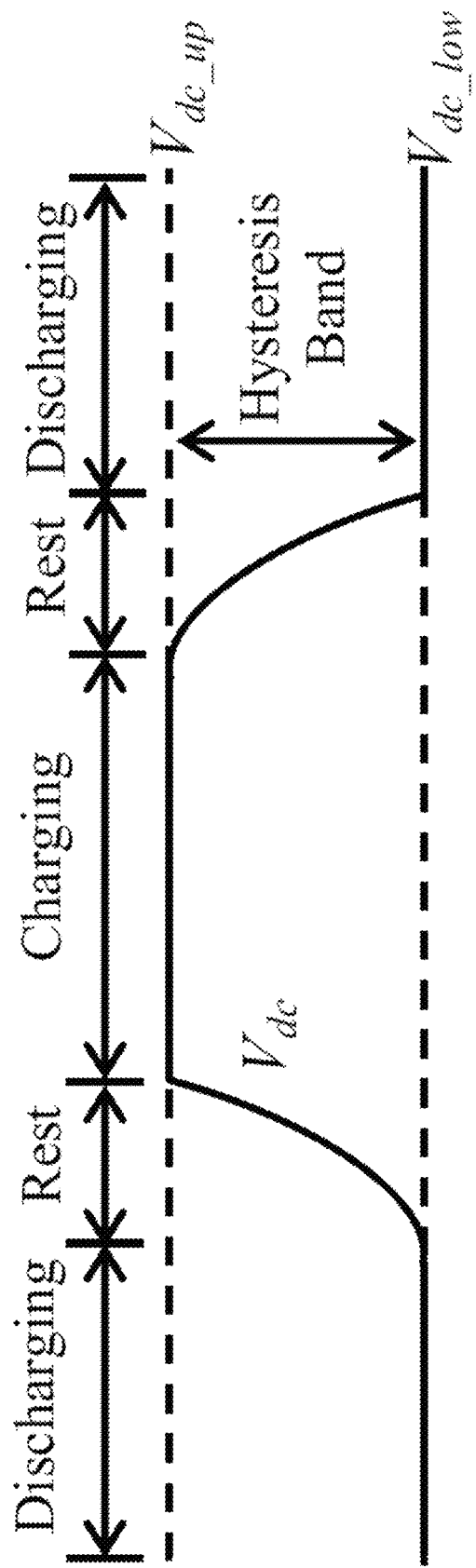
FIG. 13a illustrates a Battery Energy Storage System (BESS) control modified hysteresis according to an embodiment of the subject invention.

In case of losing the AC input source shown in FIG. 10, the DC/DC converter was used to stabilize the common DC-bus voltage and keep it constant regardless of the battery-current variation. To achieve that, a modified hysteresis band control strategy was applied to maintain the common DC-voltage within a specific band. Therefore, the battery charging/discharging was controlled so that Vdc should not violate the defined upper and lower limits, Vdc_up and Vdc_low, as shown in FIG. 13a. A decision criterion became the common Vdc, and the DC/DC converter operated as following scheme:

If $V_{dc}>V_{dc\_up}$, then charging: $V_{dc\_ref}=V_{dc\_up}$

If $V_{dc}<Vdc\_low$, then discharging: $T_{dc\_ref}=V_{dc\_low}$

If $V_{dc\_low}=\leq V_{dc}\leq V_{dc\_up}$, then no control(rest). (34)

Figure 13B:
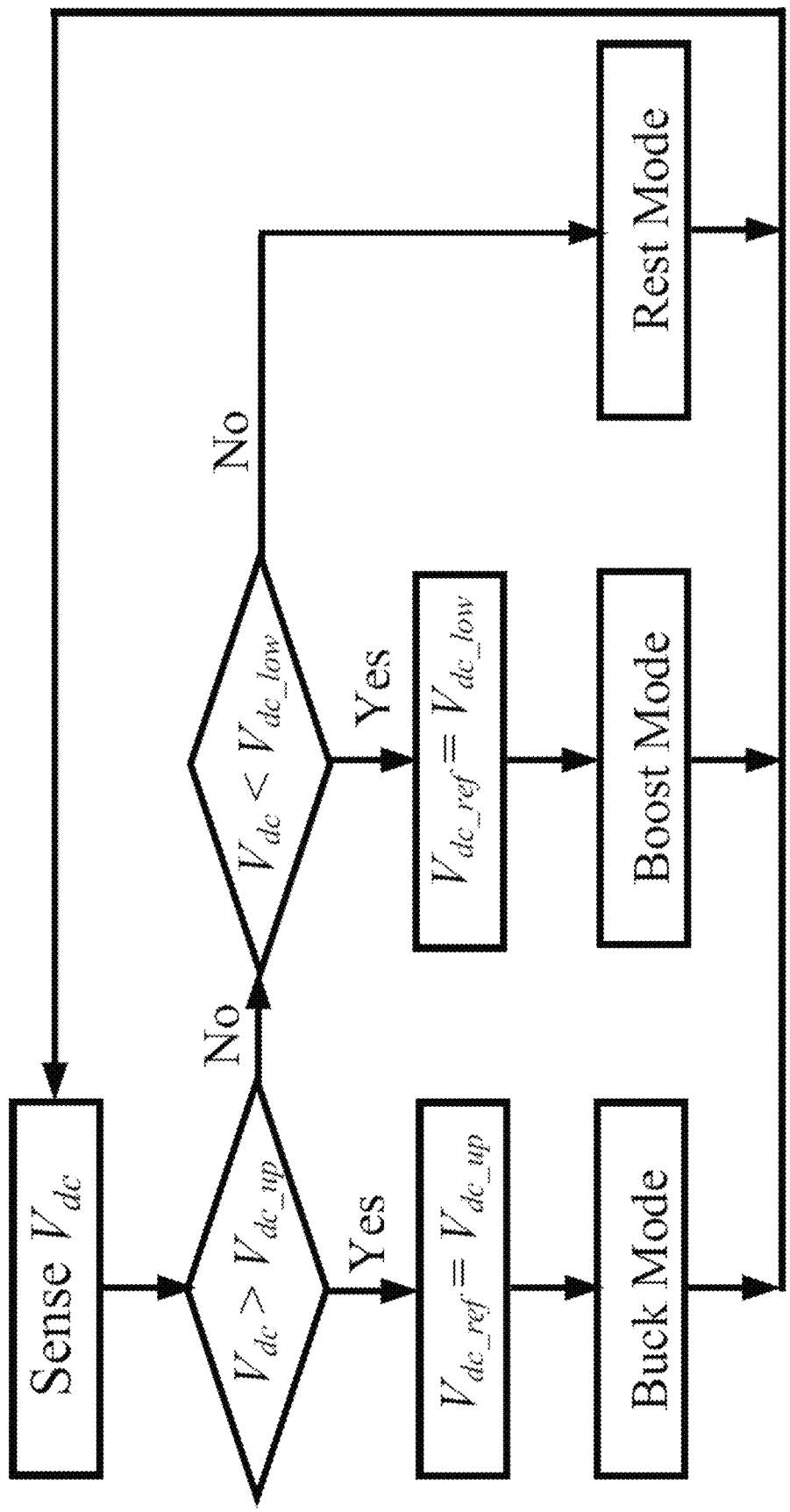
FIG. 13b illustrates a BESS control flow chart according to an embodiment of the subject invention.

Accordingly, FIG. 13b shows the designed hysteresis control of the battery-mode while charging, discharging and at rest modes.

In the next section a complete hardware implementation of the voltage-controlled power converter is introduced. This hardware model was completely designed, fabricated, and implemented for this example.

IV. Hardware Test Results

In this section, the experimental results of the provided grid-connected system were provided. The specifications and parameters used are shown in Table 5.

TABLE 5

Typical System Data, Hardware Setup Data

| Parameters | Specification |
| --- | --- |
| Input Supply (KW) | 0-5 |
| Input voltage (V) | 3-Ø, 208 v, 60 Hz |
| Input Inductor (mH) | 30 |
| Converter Rating (KW) | 10 |
| DC Side Capacitance (μF) | 2200 |
| DC Voltage (V) | 300 |
| DC Resistance (Ω) | 70-140 |
| Switching Frequency (kHz) | 5-10 |

Figure 20:
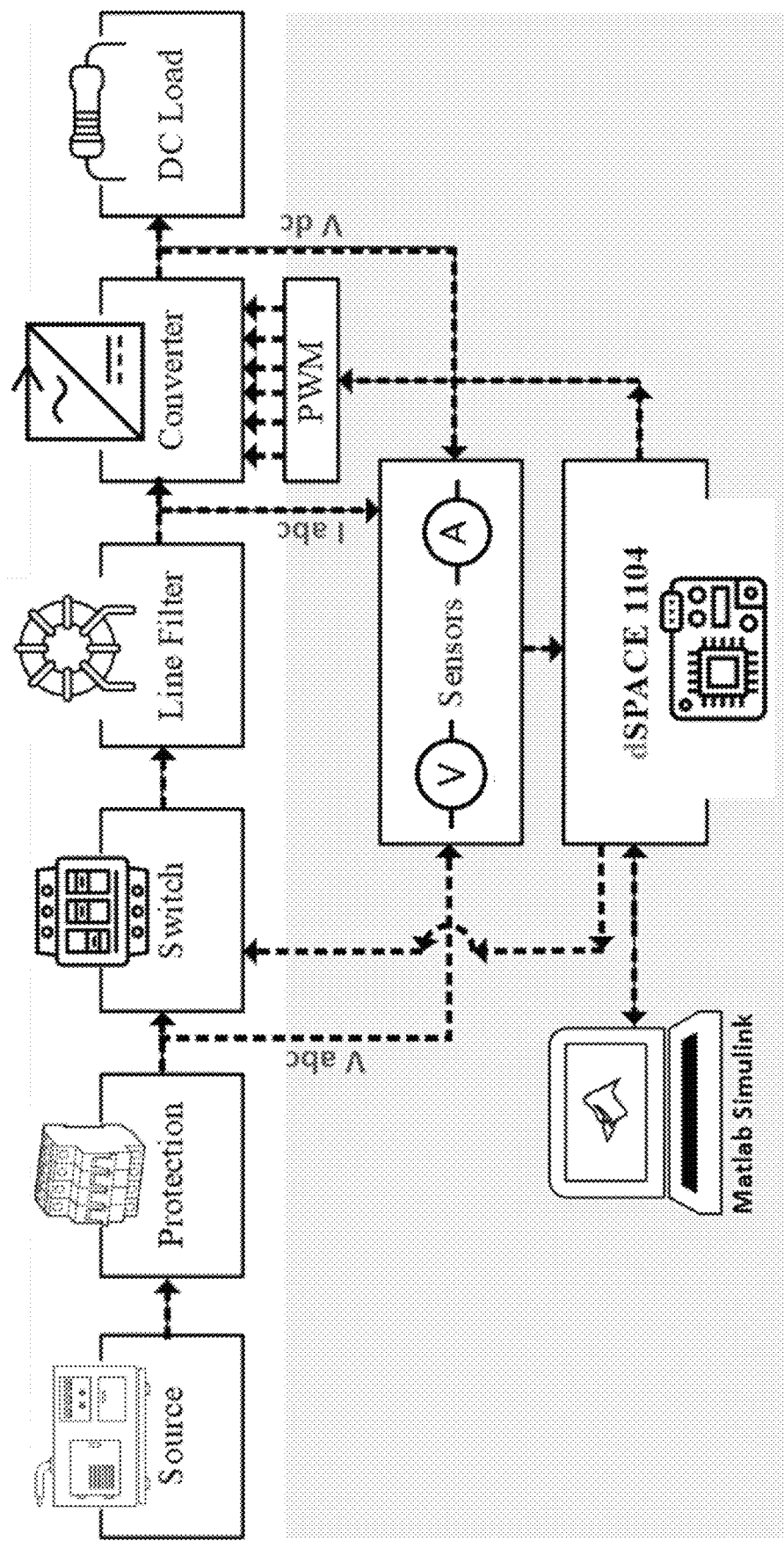
FIG. 20 illustrates a Power and Control diagram of the hardware setup according to an embodiment of the subject invention.

The hardware setup comprises of two main circuits as shown in FIG. 20. The first one is the main power circuit, while the second is the control circuit. For the main power circuit, it has a 3-Ø, 208 v phase-rms, 60 Hz, AC supply, a main switch, a main fuse, a line filter reactor, an IGBT based power converter module and a DC load. The control circuit had LEM current and voltage sensors to get actual measurements, dSPACE 1104 interfaced with MATLAB SIMULINK to implement the real-time control. For signal capturing purposes, TEKTRONIX MDO4104 (Tektronix, Inc., Beaverton, OR) was used.

To test performance of one embodiment of the subject invention, different operation scenarios were conducted to validate the provided RANNTC controller performance. Hence, a comparison between the conventional PI-PI controller and the provided one was introduced. The study showed the practical differences between both the conventional PI-PI and the provided RANNTC intelligent controller under 10 different operating conditions. These operating conditions included system start up, step ref. voltage change (increase and decrease) and under step load change (increase and decrease). Different scenarios were tested at fsw equals to 5 and 10 kHz, respectively, as follows.

A known system start-up procedure for the most widely known 3-Ø boost rectifier was used (M. Kumar, et. al, "Startup Procedure for DSP-Controlled Three-Phase Six-Switch Boost PFC Rectifier," in IEEE Transactions on Power Electronics, vol. 30, no. 8, pp. 4514-4523, August 2015, doi: 10.1109/TPEL.2014.2351752; which is hereby incorporated by reference in its entirety, including all figures and tables.) A detailed start up procedure was followed. The start-up process included the operation of the uncontrolled diode bridge to charge the DC side capacitor initially. Then a controlled operation was done while having a smooth dynamic transient response.

A. System Start Up

For starting certain embodiments of the system, some checks and precautions need to be done before running the hardware. These checks are concluded in using the appropriate rating switch and fuse of the main power circuit, getting the 3-phase voltage measurements just upstream the main switch, testing the SPWM pulses deadtime applied to the six switches, all the six IGBT's are in a normally open (NO) state initially, having all LEM sensors correctly calibrated.

When sending a close signal to the main switch, the power converter operated as a 3-Ø uncontrolled rectifier and hence, the DC voltage starts to build up on the DC link and reached the max line voltage.

Figure 21A:
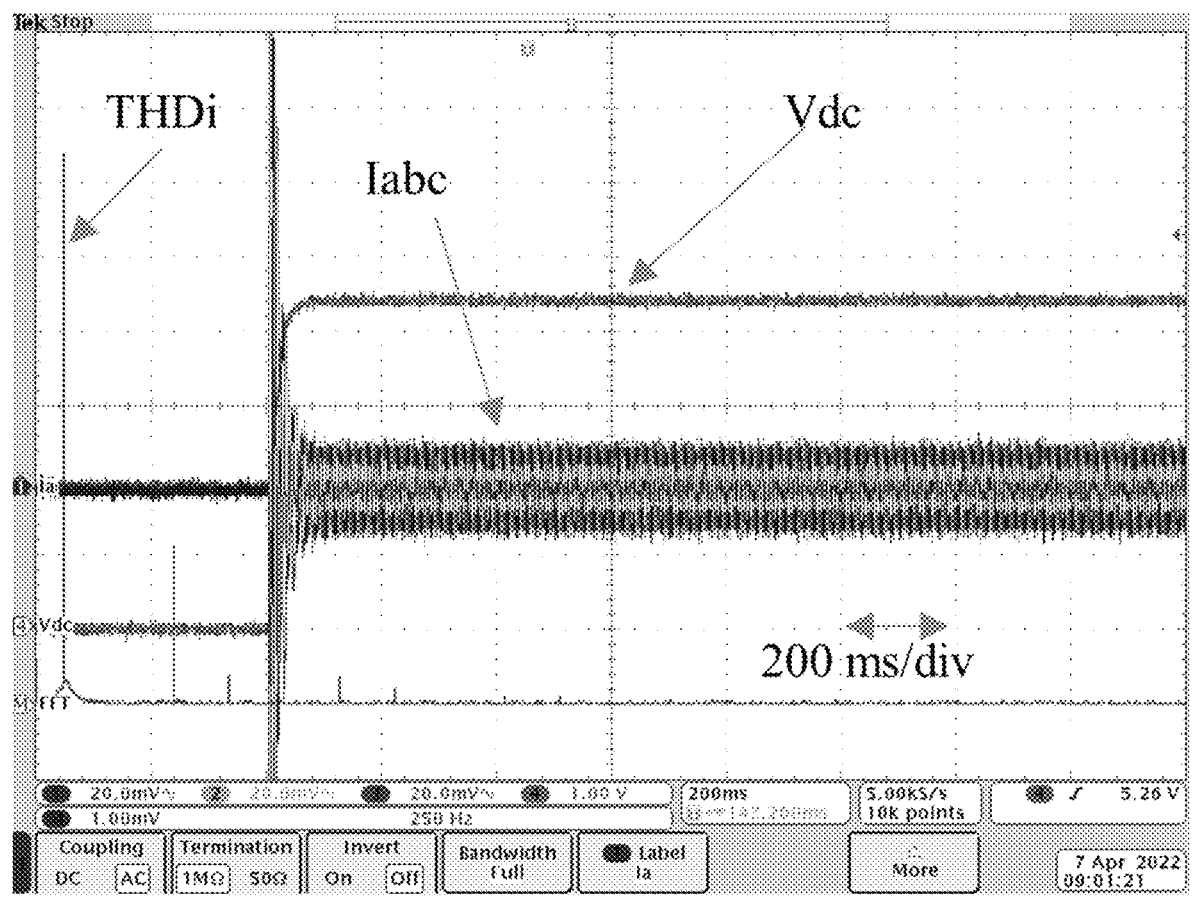
FIGS. 21a and 21b illustrate a system start-up with uncontrolled rectifier operation: (a) at switching instant, (b) at steady state according to an embodiment of the subject invention.
Figure 21B:
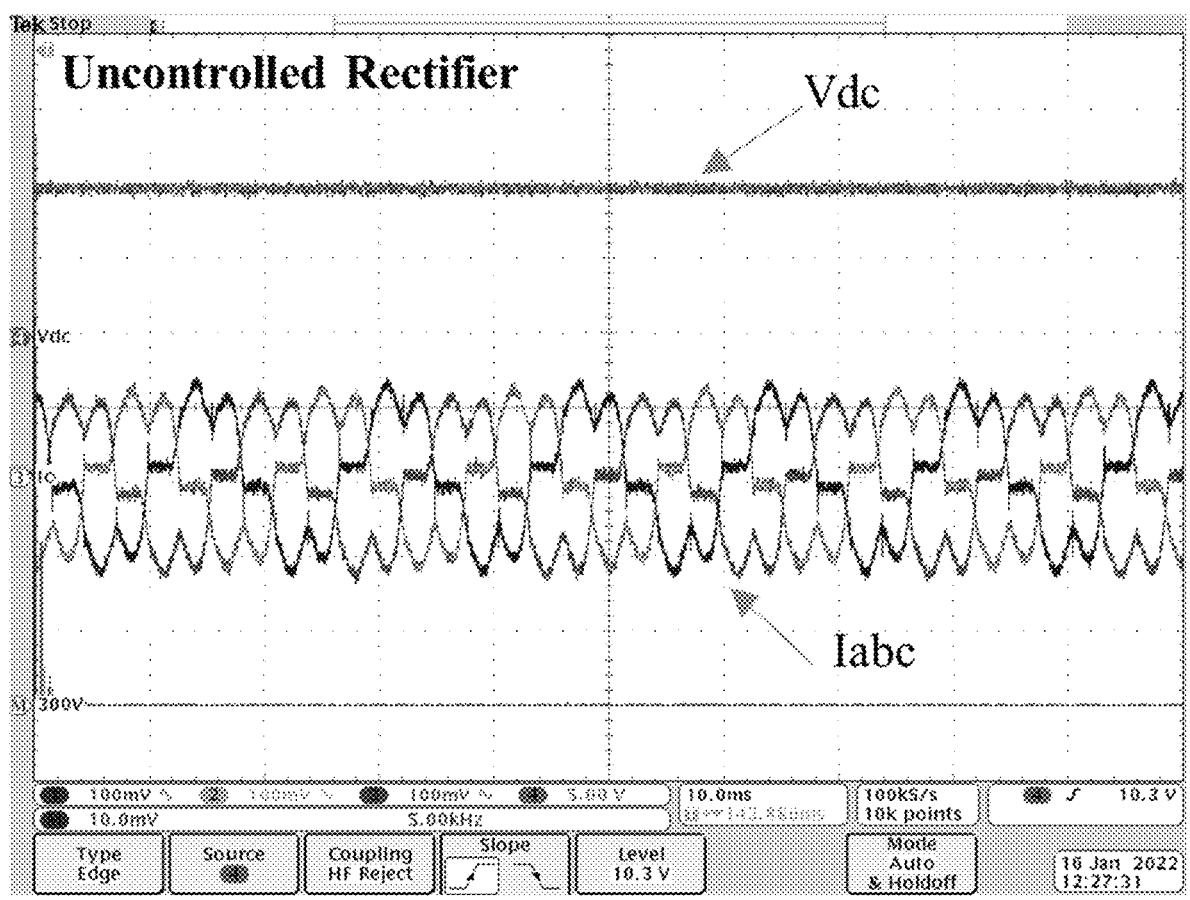

For better transient, the converter was initially operated at uncontrolled mode to charge the DC side capacitor before switching to the controlled mode. FIGS. 21a and 21b show the DC voltage build up across the DC side capacitor.

For a controlled rectifier operation, grid synchronization is a must through a phase locked loop (PLL) algorithm. This PLL technique is widely used for theta Θ angle detection to be used in vector control applications. Such a synchronization mechanism is less adaptive to weak grids. In certain embodiments, including the test below, the main source of power is assumed to be a stiff grid.

Figure 22A:
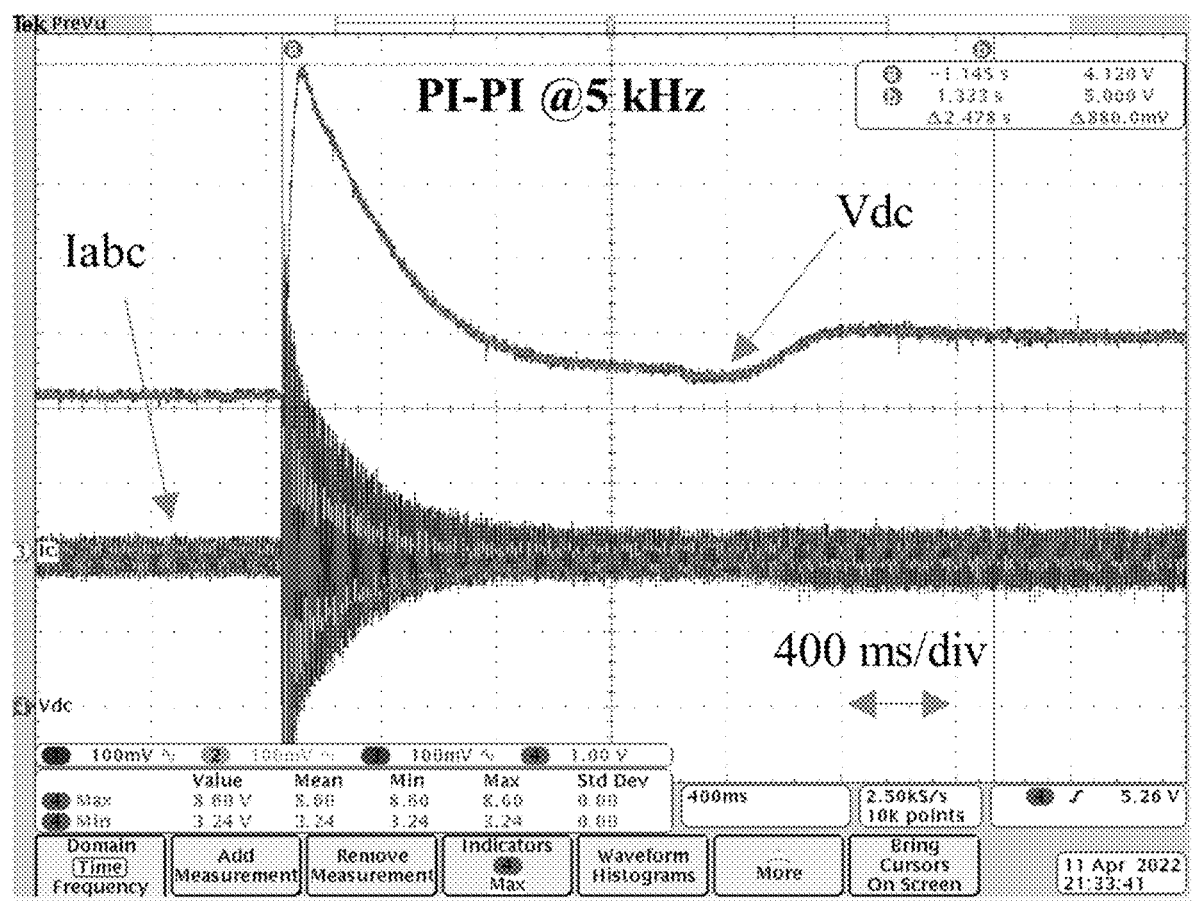
FIGS. 22a and 22b illustrates the test results for the power rectifier start up with: (a) PI-PI @5 kHz, (b) RANNTC @5 kHz according to an embodiment of the subject invention.
Figure 22B:
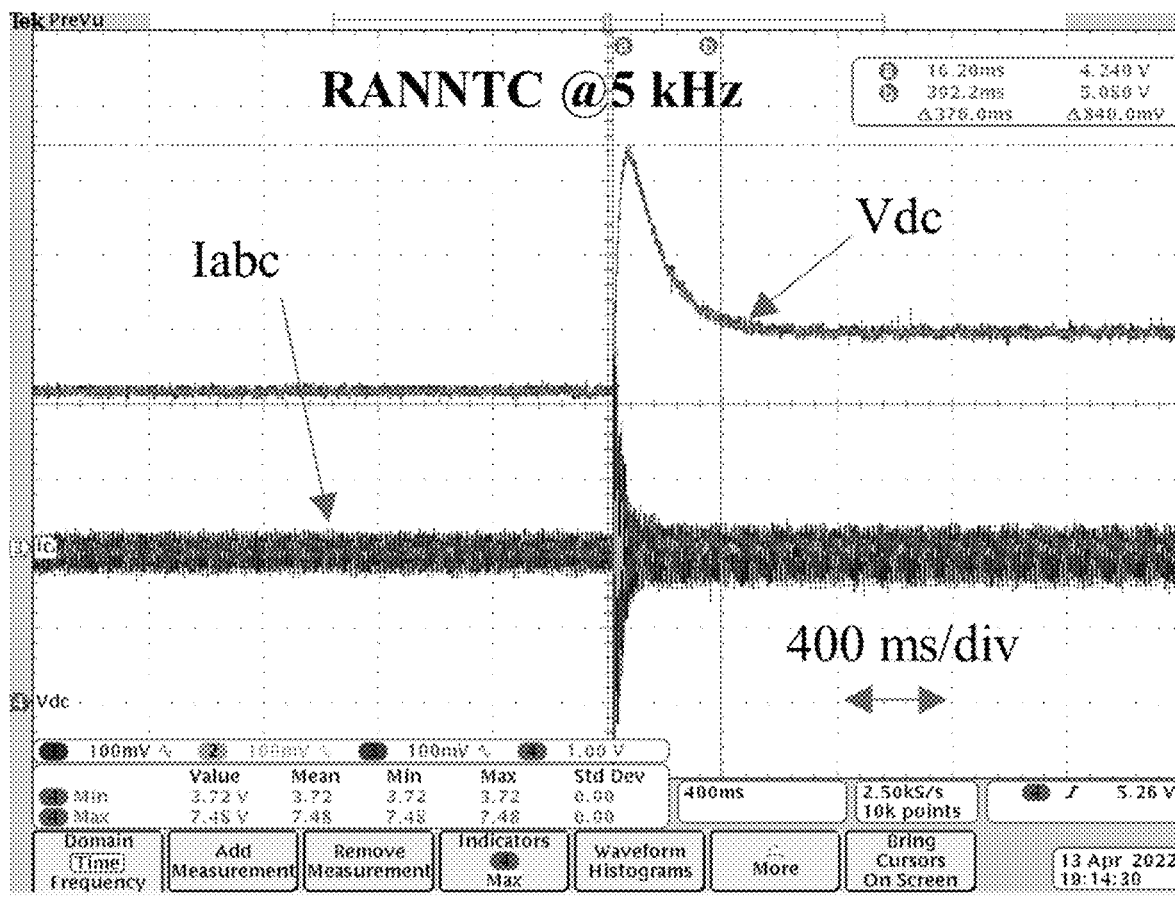
Figure 23A:
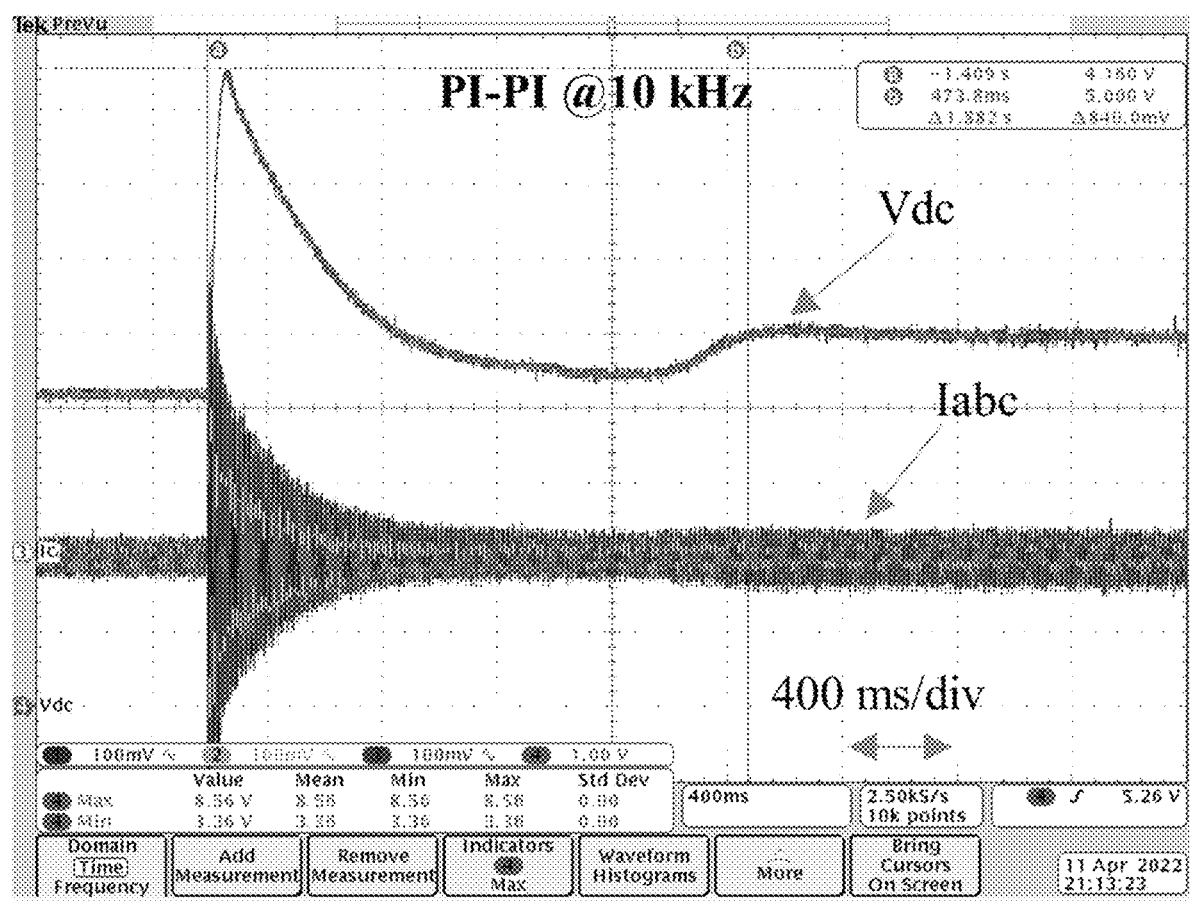
FIGS. 23a and 23b illustrate the test results for the power rectifier start up with: (c) PI-PI @ 10 kHz, (d) RANNTC @ 10 kHz according to an embodiment of the subject invention.
Figure 23B:
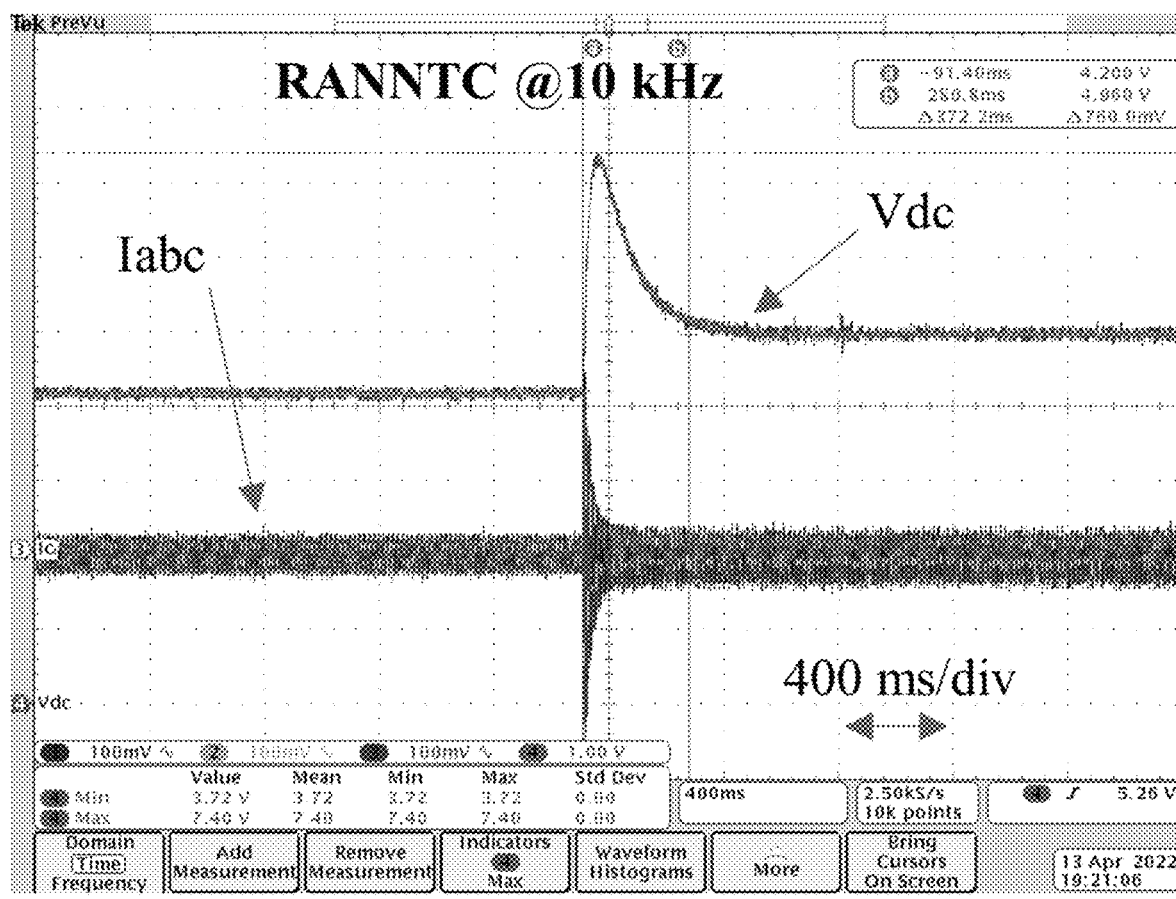

After charging the DC side capacitor to the peak line voltage level, the feedback/closed loop control was applied to the power rectifier. The applied ref. DC voltage was 300 v. In FIG. 22a, the dynamic and steady state responses for both voltages and line currents are captured using traditional PI-PI controller at fsw=5 kHz. The DC side voltage experienced a very slow transient state before settling at the desired ref. DC voltage level within 2.478 s. At transient, the DC voltage went up to a maximum value of 516 v then dropped down to 270 v before settling around the reference value of 300 v. The system response with the provided RANNTC controller at 5 kHz was shown in FIG. 22b, where the DC voltage and line currents passed through a short transient after reaching maximum level of 448 v. Then, it settled at 300 v after almost 377 ms, providing a response that reached steady state more quickly, with less overshoot, and with greater stability as compared to the related art PI-PI controller. The power rectifier was then operated at fsw=10 kHz while using the PI-PI controller. The dynamic and steady state responses of the Vdc and iabc were captured as shown in FIG. 23a. The Vdc of the PI-PI at 10 kHz had a quicker transient than the PI-PI at 5 kHz. Also, the DC voltage hit a peak of 510 v before settling at 300 v after 1.882 s. FIG. 23b shows the system dynamics when operated with the provided RANNTC at 10 kHz, where the Vdc and iabc had the fastest transient within 372 ms and reached a peak value of 444 v before settling around the V*dc value of 300 v.

From this test, it was clear that this embodiment of the provided RANNTC controller had a better performance on the system's transient and steady state behavior when compared to related art controllers. Referring, for example, to FIG. 22a and FIG. 22b, the transient and steady state responses of the provided controller were more enhanced in terms of overshoot (24% lower), settling time (85% reduced), and THD % (55% lower).

B. Performance Against Step Ref. DC Voltage Change

After reaching the desired reference level of the DC voltage, this test was done to evaluate the different controller's performance against a step change of the DC voltage level. FIGS. 15a and 15b show the DC voltage and line currents transient and steady state responses of the system while using both the conventional PI-PI and the provided RANNTC controllers respectively at fsw=5 kHz.

A V*dc step change was applied to the system from 300 v to 325 v and then back to 300 v. As shown in FIG. 15a, the conventional PI-PI controller at 5 kHz reacted to that change and followed the V*dc for the step up within 72.2 ms and for the step down within 47.8 ms. In FIG. 15b, the provided RANNTC controller at 5 kHz followed the step change quicker and tracked the V*dc for the step up within 39.2 ms and for the step down within 24.6 ms. The power rectifier was then operated at fsw=10 kHz. FIGS. 16a and 16b show the system behavior when controlled at fsw=10 kHz using both PI-PI and the provided RANNTC controllers respectively. Increasing the switching frequency to 10 kHz, with PI-PI controller, resulted in reducing the settling time to 48.2 ms for the step up and 43.4 ms for the step down as shown in FIG. 16a. While in FIG. 16b, the provided RANNTC controller with 10 kHz gave the lowest settling time with only 28.6 ms for step up and 19.5 ms for step down.

It was noticed that operating the system at higher switching frequencies resulted in better performance for both controllers. When using the provided RANNTC controller at 5 kHz, the voltage stepped down from 325 v to 300 v within 24.6 ms. This was almost half the time needed by the conventional PI controller at the same frequency.

More improvement was achieved when using the provided RANNTC controller with 10 kHz. The provided controller was only 19.5 ms to reach the desired reference DC voltage. It was noticed that the best performance was obtained when using the provided RANNTC with 10 kHz and hence a 60% reduction in the settling time compared to the conventional PI at 5 kHz.

C. Performance Against Step Load Change

Another test was applied to the system to check the different controller's performance and robustness against step load change. The resistive load connected to the DC side was suddenly increased by 100% through reducing its value from 140Ω to 70Ω. Then the load decreased by 50% through increasing the load resistance back from 70Ω to 140Ω.

The test was done for both the PI-PI and the provided RANNTC controllers at switching frequencies of 5 and 10 kHz. As shown in FIG. 17a, the DC voltage experienced a dip to a minimum value of 268 v and recovered back again to 300 v after 291 ms with load increase. Also, the DC voltage reached a peak of 326 v and took 207 ms to recover to 300 v back again after decreasing the load.

The provided RANNTC controller was tested against the step load change while operating the system at fsw=5 kHz. In FIG. 17b, the load increased, and the DC voltage dipped to 275 v before recovering to 300 v within 235 ms. Also, when the load decreased again, the Vdc reached a peak of 324 v before recovering to 300 v within 184 ms.

Figure 18A:
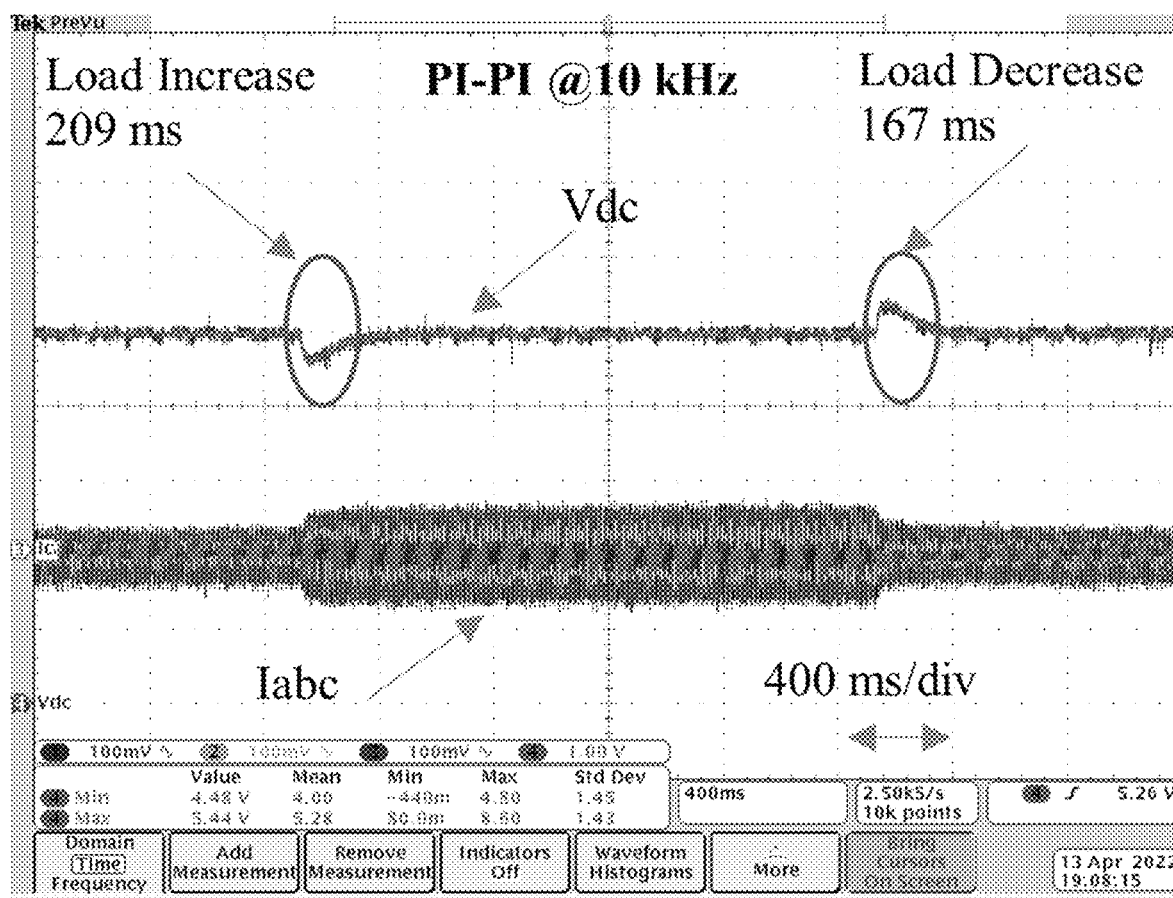
FIGS. 18a and 18b illustrate a step change in DC load from 140Ω to 70Ω to 140Ω at Fsw=10 kHz: for (a) conventional PI controller and (b) RANNTC controller according to an embodiment of the subject invention.
Figure 18B:
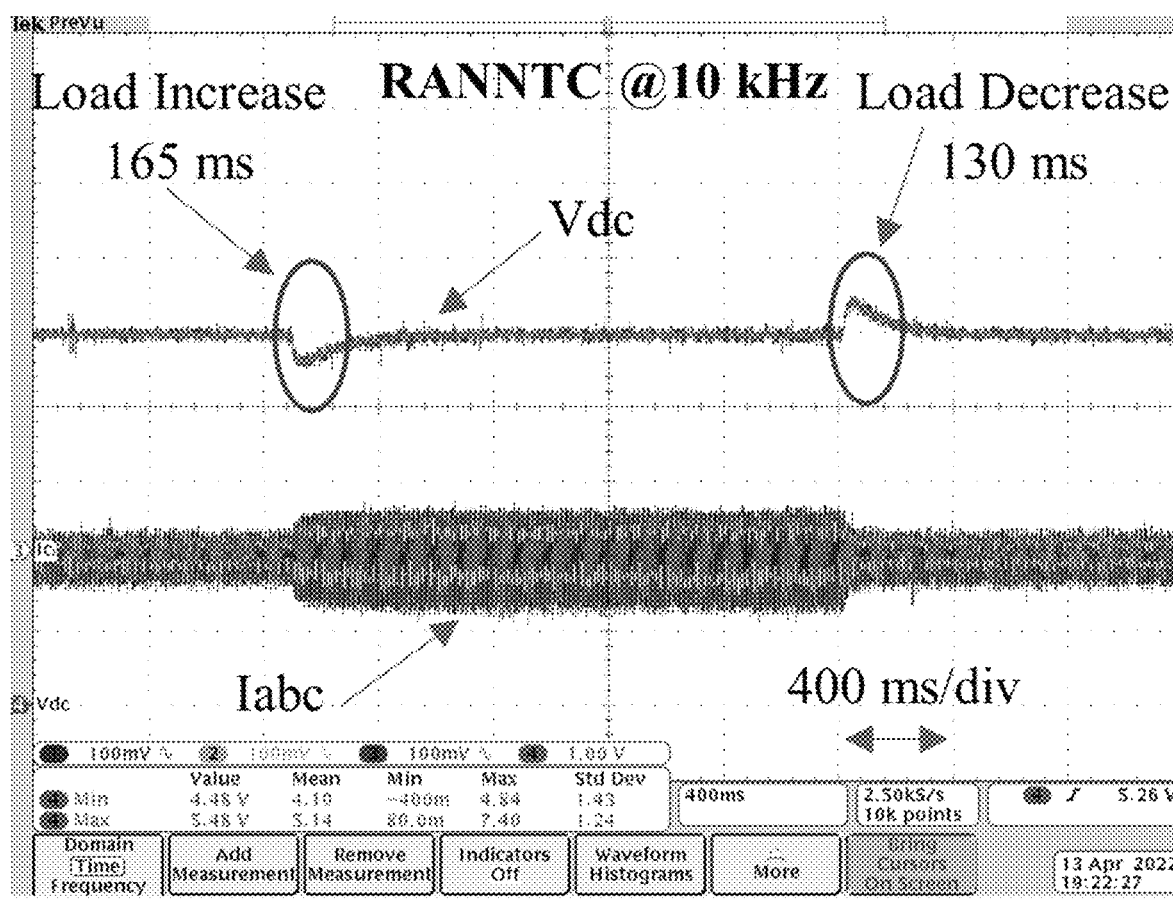

The same test was performed while the system was operated at higher switching frequency, Fsw=10 kHz. In FIG. 18a, using the PI-PI with 10 kHz, the DC voltage dipped to 272 v before getting back to 300 v after 209 ms with load increase and it had a voltage rise to 326 v and settled at 300 v after 167 ms with load decrease. In FIG. 18b, using the provided RANNTC with 10 kHz the voltage dipped to 264 v before getting back to 300 v after 165 ms with load increase and it had a voltage rise to 324 v and settled at 300 v after 130 ms with load decrease.

It was noted that operating the system at higher switching frequency resulted in a better transient and steady state performance for both controllers. Also, there was a reduction of around 35-40% in the settling time moving from the related art PI-PI controller and the tested RANNTC controller, according to an embodiment of the subject invention.

V. Performance Evaluation of the RANNTC Controller

In this section, a comparative analysis is introduced based on system's response and power quality.

A. System Performance Comparative Analysis

The novel RANNTC controller was compared with a conventional PI controller for performance evaluation. Table 3 summarizes the actual hardware experimental results and comparative analysis.

As shown in FIGS. 19a and 19b, the tested controllers performance differently when applying a DC voltage step change and different loading conditions. FIG. 19a shows the different controller's performances when a step DC voltage step change was applied. FIG. 19b showed the different controller's performances against a load step change.

The provided RANNTC controller that was operated with 5 kHz switching frequency had better transient dynamics with lower time response than the conventional PI-PI that was operated at a 10 kHz Fsw. The provided RANNTC operated at 10 kHz switching frequency had the best transient dynamics with the lowest time response at almost 19.5 ms when the DC voltage stepped down. The conventional PI-PI controller, that was operated at 5 kHz switching frequency, had the longest time response with 72.2 ms when DC voltage stepped up.

The above testing demonstrated several advantages of the provided RANNTC controller embodiment over the related art PI-PI controller when operating the system at lower switching frequencies.

B. Power Quality Comparative Analysis

The provided RANNTC controller was tested against parameter variation by changing the line filter inductance by 50%. Then, total harmonic distortion THD was calculated based on the different case studies. Firstly, the system was operated with 30 mH line inductor, then a 15 mH line inductor was used.

Figures 24A, 24B:
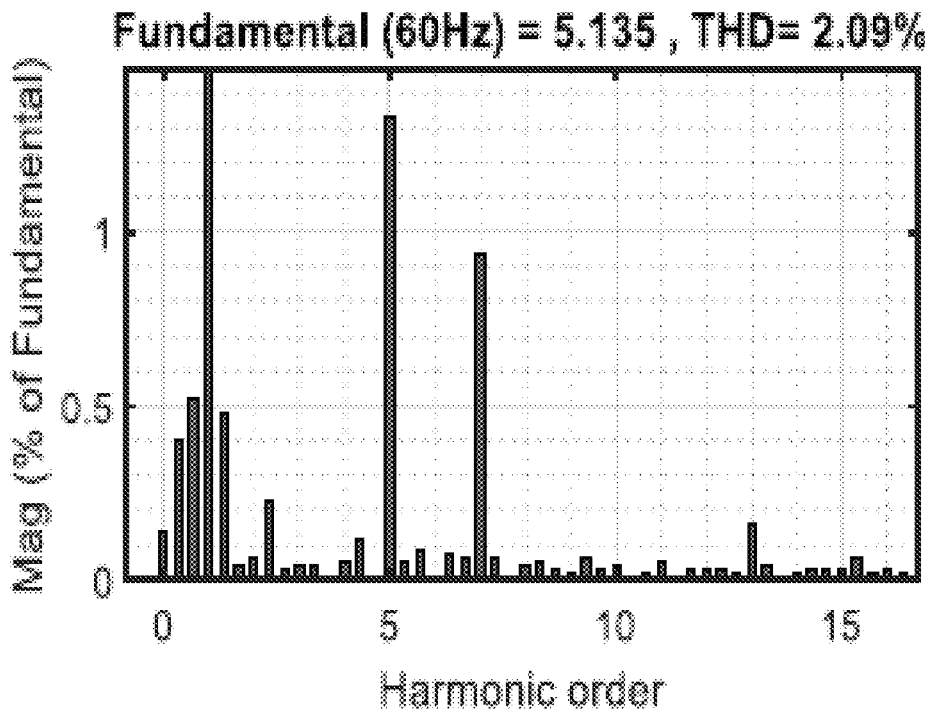
FIGS. 24a and 24b illustrate a PI-PI system response at 5 kHz against parameter variation: (a) AC line currents and THD with 30 millihenries (mH) (b) AC line currents and THD with 15 mH.
Figure 25A:
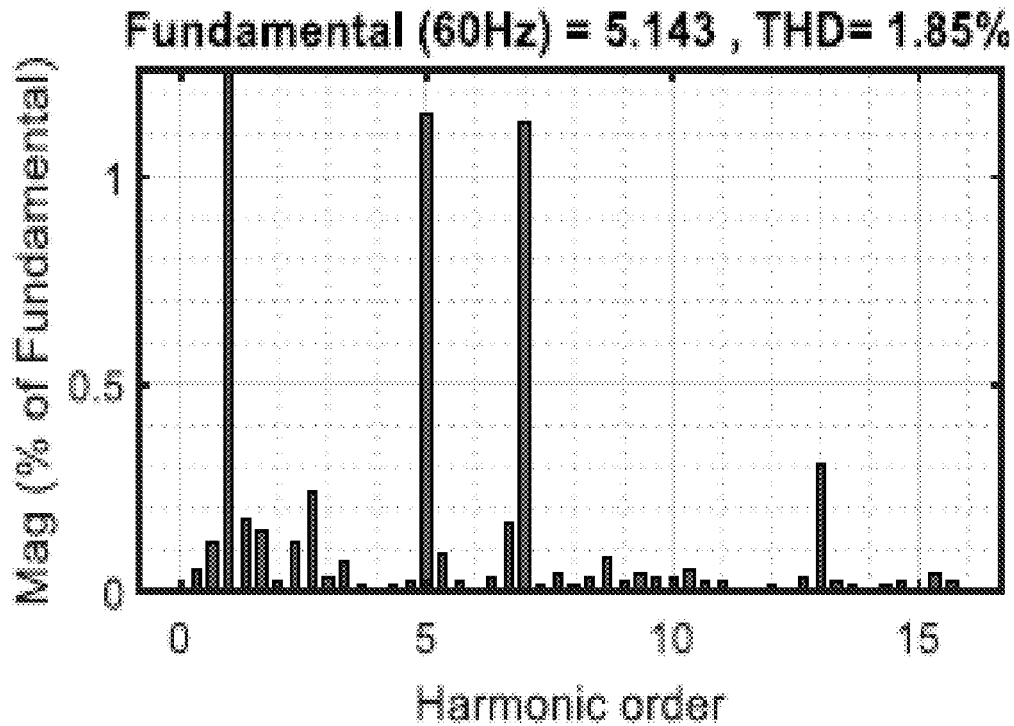
FIGS. 25a and 25b illustrate a PI-PI system response at 10 kHz against parameter variation: (a) AC line currents and THD with 30 mH (b) AC line currents and THD with 15 mH.
Figure 25B:
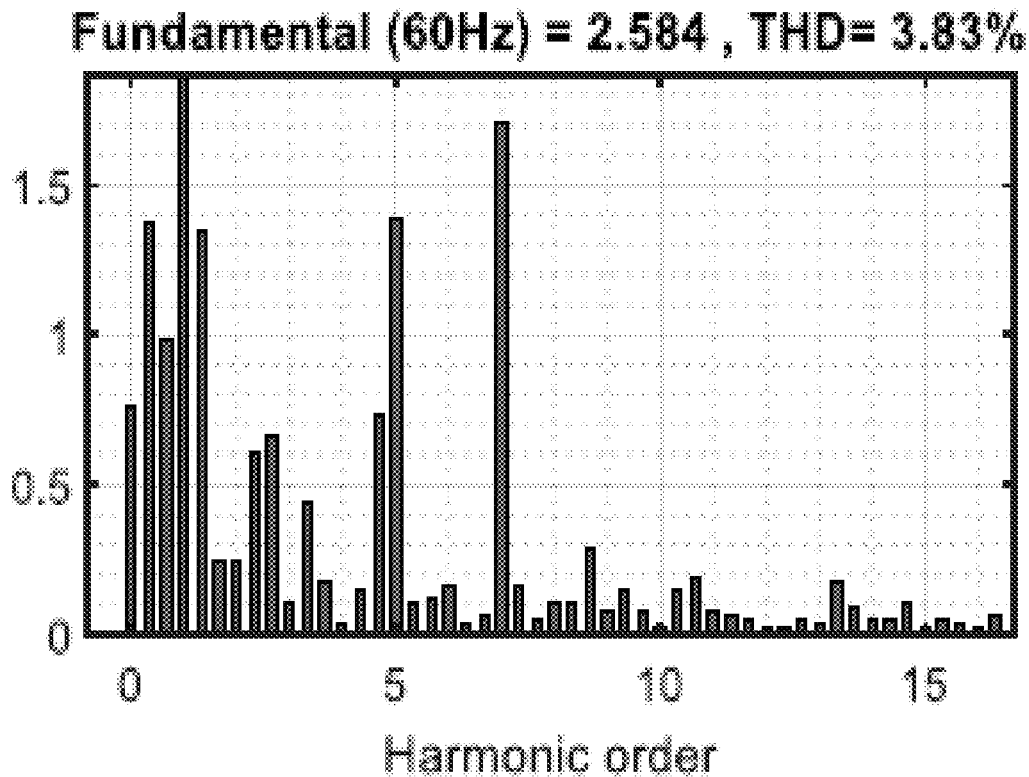

FIGS. 24a and 24b show AC line currents along with THD % for the conventional PI-PI at 5 kHz. FIG. 24a shows both line currents and THD of 2.09% with 30 mH line inductance. FIG. 24b shows both line currents and THD of 4.19% with 15 mH line inductance. Another test was done for the PI-PI at 10 kHz. FIG. 25a shows both line currents and THD of 1.85% with 30 mH line inductance. FIG. 25b shows both line currents and THD of 3.83% with 15 mH line inductance.

Figure 26A:
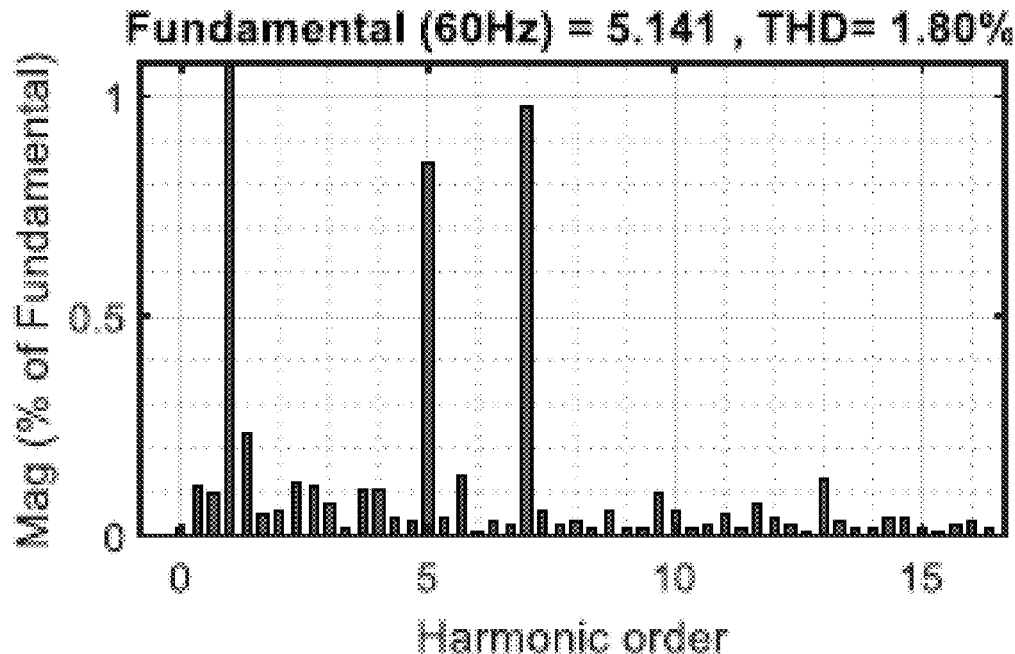
FIGS. 26a and 26b illustrates a RANNTC system response at 5 kHz according to an embodiment of the subject invention, against parameter variation: (a) AC line currents and THD with 30 mH (b) AC line currents and THD with 15 mH.
Figure 26B:
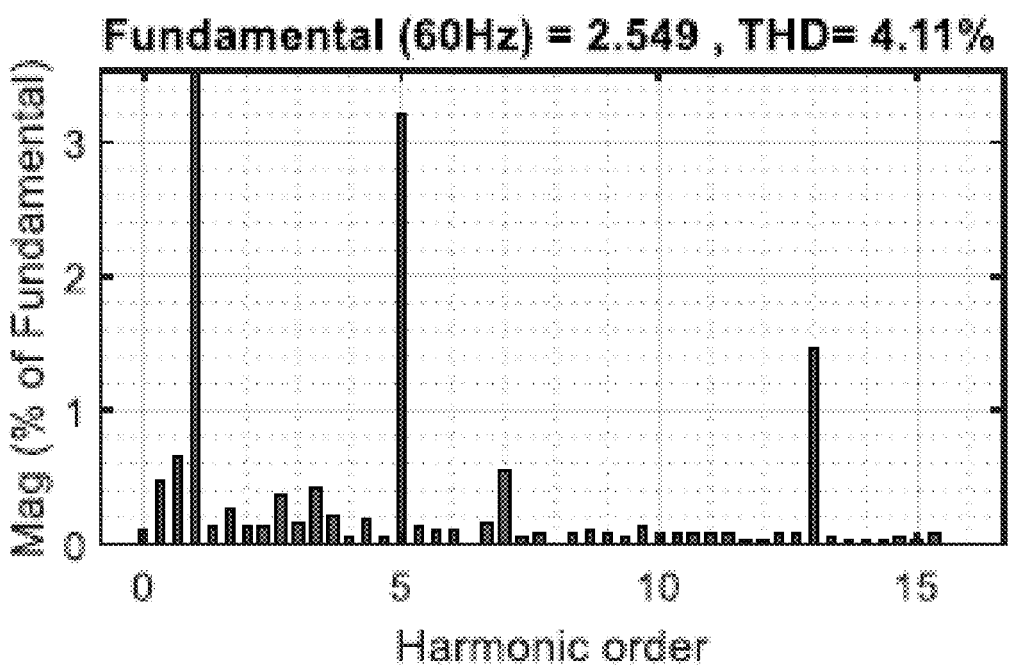
Figure 27A:
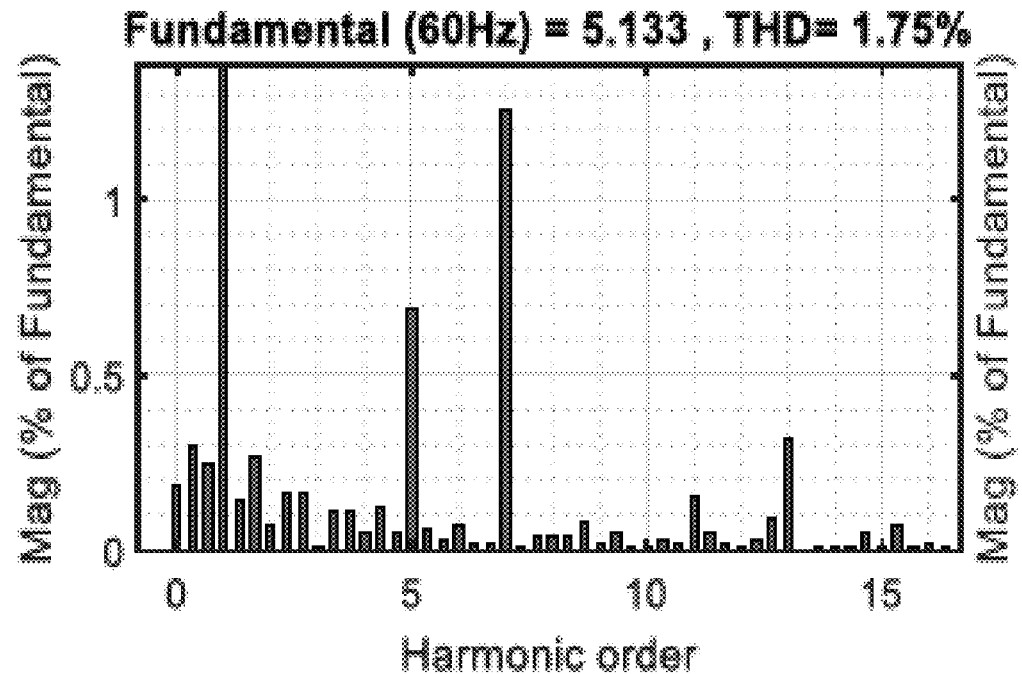
FIGS. 27a and 27b illustrate a RANNTC System response at 10 kHz according to an embodiment of the subject invention, against parameter variation: (27A) AC line currents and THD with 30 mH (27B) AC line currents and THD with 15 mH.
Figure 27B:
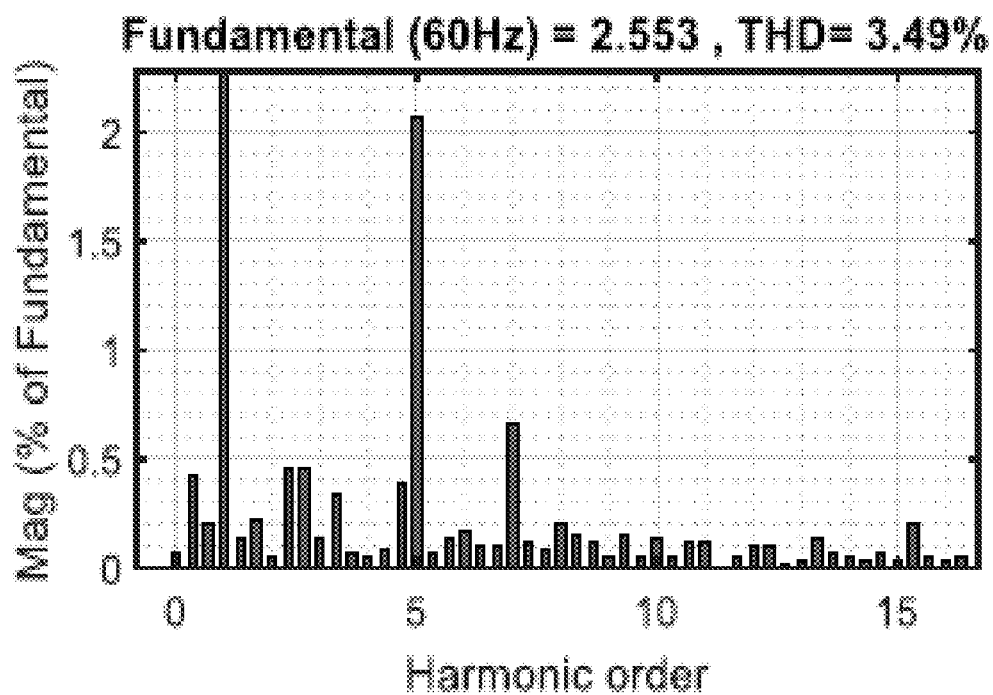

FIGS. 26a and 26b show AC line currents along with THD % for the conventional RANNTC at 5 kHz. FIG. 26a shows both line currents and THD of 1.80% with 30 mH line inductance. FIG. 26b shows both line currents and THD of 4.11% with 15 mH line inductance. Another test was done for the RANNTC at 10 kHz. FIG. 27a shows both line currents and THD of 1.75% with 30 mH line inductance. FIG. 27b shows both line currents and THD of 3.49% with 15 mH line inductance.

A simple architecture of DC microgrid (DCMG) comprising an energy storage system (ESS) is provided by embodiments of the subject invention. A complete mathematical model representation is provided for the power system including grid-connected converter. Standard vector control is provided in certain embodiments, along with its complete structure and mathematical model. Embodiments provide a novel RANNTC controller and the inventors have compared its dynamic and steady-state performance as compared to related art controllers.

Different operating scenarios have been investigated using a test system embodiment. These scenarios included DC voltage step change, AC input voltage change, different loading conditions from light to full load, and charging and discharging an energy storage element like a battery. An embodiment comprising a complete hardware system has been designed, fabricated, and implemented in a hardware environment in the ESRL testbed, and the hardware test results have been verified. The overall system performance of certain embodiments has been tested against various operating conditions in both simulation and hardware environments. A favorable performance comparison has been conducted between a related art conventional PI-PI controller and the provided RANNTC intelligent controller according to an embodiment of the subject invention. The provided RANNTC controller according to an embodiment of the subject invention has been shown to exhibit faster responses and enhanced robustness against disturbances and parameter variations.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A three-phase pulse-width-modulated (PWM) power converter device suitable for adaptive microgrid control, the three-phase PWM power converter device comprising:
   an outer direct current (DC) voltage control loop comprising a proportional-integral (PI) controller; and
   an inner three-phase alternating current (AC) control loop,
   the inner three-phase AC control loop comprising:
      a first Robust Artificial Neural Network Tracking Control (RANNTC); and
      a second RANNTC,
   each of the first RANNTC and the second RANNTC, respectively, comprising a neural network trained on data captured from the PI controller,
   the first RANNTC being connected to a first Online Learning Recurrent Radial Basis Function Neural Network (RRBFN), and the second RANNTC being connected to a second RRBFN,
   each of the first RRBFN and the second RRBFN comprising an input layer, a hidden layer, and an output layer,
   each of the first RRBFN and the second RRBFN being trained where an objective is to minimize the following cost function:

$$E(t) = \frac{1}{2}\left[\Lambda_d(t) - \hat{\Lambda}_o(t)\right]^2 = \frac{1}{2}[e(t)]^2$$

where $E(t)$ is an error function, $\Lambda_d(t)$ is a desired output, $\hat{\Lambda}_o(t)$ is an actual output for each discrete time t, and
each of the first RRBFN and the second RRBFN being trained using the following update laws:

$$\Delta\Theta_j(t) = -\eta_\Theta \frac{\partial E(t)}{\partial \Theta_j(t)}$$

$$\Delta p_j(t) = -\eta_p \frac{\partial E(t)}{\partial p_j(t)}$$

$$\Delta\vartheta_{ij}(t) = -\eta_\vartheta \frac{\partial E(t)}{\partial \vartheta_{ij}(t)}$$

$$\Delta\sigma_{ij}(t) = -\eta_\sigma \frac{\partial E(t)}{\partial \sigma_{ij}(t)}$$

where $\Theta_j(t)$ is a weight from the hidden to the output layer, $\vartheta_{ij}(t)$ is a vector that is the center of $\Psi_j(t)$, which is an output of the hidden layer, $p_j(t)$ is a self-feedback gain of the hidden layer, $\sigma_{ij}(t)$ is a vector that is the width of the $\Psi_j(t)$, $\eta_\Theta$ is a learning rate parameter of $\Theta_j(t)$ and is greater than zero, $\eta_\vartheta$, is a learning rate parameter of $\vartheta_{ij}(t)$ and is greater than zero, $\eta_\sigma$ is a learning rate parameter of $\sigma_{ij}(t)$ and is greater than zero, and $\eta_p$ is a learning rate parameter of $p_j(t)$ and is greater than zero.

2. The device according to claim 1, the inner three-phase AC control loop further comprising a three-phase sinusoidal pulse width modulation (SPWM) rectifier.

3. The device according to claim 2, the PI controller being a first PI controller, and at least one of the first RANNTC and the second RANNTC, respectively, comprising a neural network trained on a second set of data captured from a second PI controller that is not the first PI controller.

4. The device according to claim 2, the PI controller being a first PI controller, the data captured from the PI controller being a first set of data, and at least one of the first RANNTC and the second RANNTC, respectively, comprising a neural network trained on either or both of:
   the first set of data, or
   a second set of data captured from a second PI controller that is not the first PI controller.

5. The device according to claim 1, the first RRBFN and the second RRBFN, each respectively, comprising a gaussian activation function.

6. The device according to claim 5, the first RRBFN and the second RRBFN, each respectively, comprising the hidden layer comprising a Gradient Descent Adaptation (GDA).

7. The device according to claim 1, the first RANNTC being configured to control a d-axis current, and
   the second RANNTC being configured to control a q-axis current.

8. The device according to claim 7, the first RRBFN being configured to optimize the first RANNTC using the data captured from the PI controller, and
   the second RRBFN being configured to optimize the second RANNTC using the data captured from the PI controller.

9. A system for adaptive microgrid control of a three-phase pulse-width-modulated (PWM) power converter device, the system comprising:
   a three-phase pulse-width-modulated (PWM) power converter device suitable for adaptive microgrid control, the device connected between a three-phase AC power source and a DC power load, the three-phase PWM power converter device comprising:
      an outer direct current (DC) voltage control loop, comprising a proportional-integral (PI) controller; and
      an inner three-phase alternating current (AC) control loop, comprising:
         a first Robust Artificial Neural Network Tracking Control (RANNTC);
         a first Online Learning Recurrent Radial Basis Function Neural Network (RRBFN) connected to the first RANNTC;
         a second RANNTC;

a second RRBFN connected to the second RANNTC; and
a three-phase sinusoidal pulse width modulation (SPWM) rectifier;
a processor in operable communication with the PI controller, the first RANNTC, the second RANNTC, the first RRBFN, the second RRBFN, and the SPWM rectifier; and
a machine-readable medium in operable communication with the processor and having instructions stored thereon that, when executed by the processor, perform the following steps:
reading a first set of sample data from at least one of the PI controller, the first RANNTC, or the second RANNTC;
tuning the first RANNTC based on the first set of sample data, to create a first tuned state of the first RANNTC;
tuning the second RANNTC based on the first set of sample data, to create a first tuned state of the second RANNTC; and
operating the SPWM rectifier under the first tuned state of the first RANNTC and the first tuned state of the second RANNTC, to control the DC power load to provide the adaptive microgrid control of the three-phase pulse-width-modulated (PWM) power converter device,
each of the first RANNTC and the second RANNTC, respectively, comprising a neural network trained on data captured from the PI controller,
each of the first RRBFN and the second RRBFN comprising an input layer, a hidden layer, and an output layer,
each of the first RRBFN and the second RRBFN being trained where an objective is to minimize the following cost function:

$$E(t) = \frac{1}{2}\left[\Lambda_d(t) - \hat{\Lambda}_o(t)\right]^2 = \frac{1}{2}[e(t)]^2$$

where E(t) is an error function, $\Lambda_d(t)$ is a desired output, $\hat{\Lambda}_o(t)$ is an actual output for each discrete time t, and each of the first RRBFN and the second RRBFN being trained using the following update laws:

$$\Delta\Theta_j(t) = -\eta_\Theta \frac{\partial E(t)}{\partial \Theta_j(t)}$$

$$\Delta p_j(t) = -\eta_p \frac{\partial E(t)}{\partial p_j(t)}$$

$$\Delta\vartheta_{ij}(t) = -\eta_\vartheta \frac{\partial E(t)}{\partial \vartheta_{ij}(t)}$$

$$\Delta\sigma_{ij}(t) = -\eta_\sigma \frac{\partial E(t)}{\partial \sigma_{ij}(t)}$$

where $\Theta_j(t)$ is a weight from the hidden to the output layer, $\vartheta_{ij}(t)$ is a vector that is the center of $\Psi_j(t)$, which is an output of the hidden layer, $p_j(t)$ is a self-feedback gain of the hidden layer, $\sigma_{ij}(t)$ is a vector that is the width of the $\Psi_j(t)$, $\eta_\Theta$ is a learning rate parameter of $\Theta_j(t)$ and is greater than zero, $\eta_\vartheta$, is a learning rate parameter of $\vartheta_{ij}(t)$ and is greater than zero, $\eta_\sigma$ is a learning rate parameter of $\sigma_{ij}(t)$ and is greater than zero, and $\eta_p$ is a learning rate parameter of $p_j(t)$ and is greater than zero.

10. The system according to claim 9, the instructions when executed by the processor further performing the following steps:
reading a second set of sample data from at least one of the PI controller, the first RANNTC, or the second RANNTC, while the system is actively controlling the three-phase pulse-width-modulated (PWM) power converter device;
optimizing a first control vector of the first RRBFN based on the second set of sample data;
optimizing a first control vector of the second RRBFN based on the second set of sample data;
tuning the first RANNTC based on the first control vector of the first RRBFN, to create a second tuned state of the first RANNTC;
tuning the second RANNTC based on the first control vector of the second RRBFN, to create a second tuned state of the second RANNTC; and
operating the SPWM rectifier under the second tuned state of the first RANNTC and the second tuned state of the second RANNTC, to control the DC power load to provide the adaptive microgrid control of the three-phase pulse-width-modulated (PWM) power converter device.

11. The system according to claim 10, the instructions when executed by the processor further performing the following steps:
reading a third set of sample data from at least one of the PI controller, the first RANNTC, or the second RANNTC, while the system is actively controlling the three-phase pulse-width-modulated (PWM) power converter device under the second tuned state of the first RANNTC and the second tuned state of the second RANNTC;
optimizing a second control vector of the first RRBFN based on the third set of sample data;
optimizing a second control vector of the second RRBFN based on the third set of sample data;
tuning the first RANNTC based on the second control vector of the first RRBFN, to create a third tuned state of the first RANNTC;
tuning the second RANNTC based on the second control vector of the second RRBFN, to create a third tuned state of the second RANNTC; and
operating the SPWM rectifier under the third tuned state of the first RANNTC and the third tuned state of the second RANNTC, to control the DC power load to provide the adaptive microgrid control of the three-phase pulse-width-modulated (PWM) power converter device.

12. The system according to claim 11, the first RANNTC being configured to control a d-axis current.

13. The system according to claim 12, the second RANNTC being configured to control a q-axis current.

14. The system according to claim 13, the first RRBFN and the second RRBFN, each respectively, comprising a gaussian activation function and the hidden layer comprising a Gradient Descent Adaptation (GDA) configured for a real-time cost function optimization.

15. The system according to claim 14, the three-phase PWM power converter device further comprising a phase locked loop (PLL),
the processor being in operable communication with the PLL, and the instructions when executed by the processor further performing the step of synchronizing with the three-phase AC power source through the PLL.

16. A three-phase pulse-width-modulated (PWM) power converter device suitable for adaptive microgrid control, the three-phase PWM power converter device comprising:
   an outer direct current (DC) voltage control loop comprising a proportional-integral (PI) controller; and
   an inner three-phase alternating current (AC) control loop,
   the inner three-phase AC control loop comprising:
      a first Robust Artificial Neural Network Tracking Control (RANNTC);
      a second RANNTC; and
      a 3-phase sinusoidal pulse width modulation (SPWM) rectifier,
   the first RANNTC being configured to control a d-axis current through a neural network trained on data captured from the PI controller; and
      the second RANNTC being configured to control a q-axis current through a neural network trained on data captured from the PI controller,
   the first RANNTC being connected to a first Online Learning Recurrent Radial Basis Function Neural Network (RRBFN), and the second RANNTC being connected to a second RRBFN,
   each of the first RRBFN and the second RRBFN comprising an input layer, a hidden layer, and an output layer,
   each of the first RRBFN and the second RRBFN being trained where an objective is to minimize the following cost function:

$$E(t) = \frac{1}{2}\left[\Lambda_d(t) - \hat{\Lambda}_o(t)\right]^2 = \frac{1}{2}[e(t)]^2$$

where $E(t)$ is an error function, $\Lambda_d(t)$ is a desired output, $\hat{\Lambda}_o(t)$ is an actual output for each discrete time t, and each of the first RRBFN and the second RRBFN being trained using the following update laws:

$$\Delta\Theta_j(t) = -\eta_\Theta \frac{\partial E(t)}{\partial \Theta_i(t)}$$

$$\Delta p_j(t) = -\eta_p \frac{\partial E(t)}{\partial p_j(t)}$$

$$\Delta\vartheta_{ij}(t) = -\eta_\vartheta \frac{\partial E(t)}{\partial \vartheta_{ij}(t)}$$

$$\Delta\sigma_{ij}(t) = -\eta_\sigma \frac{\partial E(t)}{\partial \sigma_{ij}(t)}$$

where $\Theta_j(t)$ is a weight from the hidden to the output layer, $\vartheta_{ij}(t)$ is a vector that is the center of $\Psi_j(t)$, which is an output of the hidden layer, $p_j(t)$ is a self-feedback gain of the hidden layer, $\sigma_{ij}(t)$ is a vector that is the width of the $\Psi_j(t)$, $\eta_\Theta$ is a learning rate parameter of $\Theta_j(t)$ and is greater than zero, $\eta_\vartheta$, is a learning rate parameter of $\vartheta_{ij}(t)$ and is greater than zero, $\eta_\sigma$ is a learning rate parameter of $\sigma_{ij}(t)$ and is greater than zero, and lap is a learning rate parameter of $p_j(t)$ and is greater than zero.

17. The device according to claim 16, the first RRBFN and the second RRBFN, each respectively, comprising a gaussian activation function and the hidden layer comprising a Gradient Descent Adaptation (GDA).

* * * * *